US012791431B2

(12) United States Patent
L'Heureux et al.

(10) Patent No.: US 12,791,431 B2
(45) Date of Patent: Nov. 10, 2026

(54) REFERENCING OPTICAL POWER LOSS MEASUREMENTS USING REFLECTOMETRIC MEASUREMENTS

(71) Applicant: EXFO Inc., Quebec (CA)

(72) Inventors: Mario L'Heureux, Levis (CA); Alexandre Drapeau, Ancienne-Lorette (CA); Kristine Palanjyan, Quebec (CA)

(73) Assignee: EXFO Inc., Quebec (CA)

( * ) Notice: Subject to any disclaimer, the term of this patent is extended or adjusted under 35 U.S.C. 154(b) by 0 days.

(21) Appl. No.: 19/174,363

(22) Filed: Apr. 9, 2025

(65) Prior Publication Data

US 2025/0327717 A1 Oct. 23, 2025

Related U.S. Application Data

(60) Provisional application No. 63/636,155, filed on Apr. 19, 2024.

(51) Int. Cl.
*G01M 11/00* (2006.01)
*H04B 10/071* (2013.01)
(Continued)

(52) U.S. Cl.
CPC .... *G01M 11/3154* (2013.01); *G01M 11/3145* (2013.01); *G01M 11/33* (2013.01);
(Continued)

(58) Field of Classification Search
CPC .......... H04B 10/07955; H04B 10/0731; H04B 10/071; G01M 11/30; G01M 11/31;
(Continued)

(56) References Cited

U.S. PATENT DOCUMENTS 5,455,672 A 10/1995 Lamonde et al.
5,625,450 A * 4/1997 Ikeno .................... G01M 11/31
356/73.1

(Continued)

FOREIGN PATENT DOCUMENTS

CN 105444990 B * 1/2018 ........... G01M 11/00
JP 61258138 A * 11/1986

OTHER PUBLICATIONS

Unknown Author, The Fiber Optic Association, Inc. "The Math of Insertion Loss." The FOA Reference Guide to Fiber Optics, 2014. Available at: http://www.thefoa.org/tech/ref/testing/5ways/lossmath.html.

(Continued)

*Primary Examiner* — Gordon J Stock, Jr.
(74) *Attorney, Agent, or Firm* — Helene Chotard

(57) ABSTRACT

Methods and systems for referencing an optical power loss measurement (OPLM) system, and methods and systems for measuring an optical insertion loss of an optical device under test (DUT) using an OPLM system referenced as such. The herein-provided reflectometric one-cord referencing method combines the capabilities of an OPLM system with that of an Optical Time Domain Reflectometer (OTDR). A first test unit comprises an optical source that is used as the light source in the OPLM. A second test unit comprises a power meter which is used as the power meter in the OPLM measurement. Either the first or the second test unit comprises an OTDR acquisition device. The reflectometric one-cord reference measures the connector loss along the reference link using OTDR capabilities of the test unit(s). Once the power reference of the OPLM devices is obtained, the reflectometric one-cord reference method may determine the optical insertion loss of the DUT while eliminating the measured connector loss.

20 Claims, 10 Drawing Sheets

(51) Int. Cl.
*H04B 10/073* (2013.01)
*H04B 10/079* (2013.01)

(52) U.S. Cl.
CPC ....... *H04B 10/071* (2013.01); *H04B 10/0731* (2013.01); *H04B 10/07955* (2013.01)

(58) Field of Classification Search
CPC .......... G01M 11/3109; G01M 11/3118; G01M 11/3127; G01M 11/3136; G01M 11/3145; G01M 11/3154; G01M 11/3163; G01M 11/3172; G01M 11/3181; G01M 11/319; G01M 11/33; G01M 11/332; G01M 11/338; G01M 11/337; G01M 11/336; G01M 11/335; G01M 11/334; G01M 11/333
See application file for complete search history.

(56) References Cited

U.S. PATENT DOCUMENTS

| | | | |
|---|---|---|---|
| 6,459,478 B1* | 10/2002 | Schmidt ................. G01M 11/31 356/73.1 |
| 6,959,126 B1 | 10/2005 | Lofland et al. |
| 7,756,418 B2 | 7/2010 | Ofalt et al. |
| 9,709,460 B2 | 7/2017 | Leblanc et al. |
| 9,749,043 B2 | 8/2017 | Perron |
| 10,139,274 B2* | 11/2018 | Schell ........................ G01J 1/44 |
| 10,416,040 B1 | 9/2019 | Prescott et al. |
| 10,567,076 B2 | 2/2020 | Liu et al. |
| 11,067,478 B2 | 7/2021 | He |
| 11,342,989 B2 | 5/2022 | Tei |
| 12,047,117 B2* | 7/2024 | He ................... H04B 10/07955 |
| 12,442,719 B2* | 10/2025 | Leclerc .................. G01M 11/33 |
| 2006/0093295 A1 | 5/2006 | Ohtani et al. |
| 2008/0044180 A1 | 2/2008 | Leonov et al. |
| 2016/0091392 A1 | 3/2016 | Fusco et al. |
| 2016/0164601 A1 | 6/2016 | Perron |
| 2016/0218802 A1 | 7/2016 | Ruchet et al. |
| 2016/0356670 A1 | 12/2016 | Brillhart et al. |
| 2022/0236141 A1 | 7/2022 | Fukumoto et al. |

OTHER PUBLICATIONS

Derickson, Dennis. Fiber Optic Test and Measurement. Prentice Hall, 1998. Section 9.2.2, "Measurement of Flange-Mount Components," pp. 340-341. ISBN: 0-13-534330-5.
Unknown Author, Telecommunications Industry Association (TIA). TIA-526-14-B: Optical Power Loss Measurements of Installed Multimode Fiber Cable Plant; IEC 61280-4-1 Edition 2. Approved Aug. 27, 2010. Published by TIA, Arlington, VA, USA.
Davis, Jim. New Developments and Tactics for Multi-Fiber Connectivity: How-to and What-with Testing. Presentation Slides, Fluke Networks, Aug. 17, 2023. [PDF document].
Roux, Charlene, and Tim Yount. New Breakthroughs in Faster and Easier Fiber Testing: All-in-One Solutions for One-Button, Automated Testing. Application Note, JDSU, Jul. 2012. [PDF document].
Unknown Author, VIAVI 4100-Series FiberComplete PRO Module for T-BERD/MTS-2000 V2, -4000 V2 and OneAdvisor 800 Platforms. Data Sheet, VIAVI Solutions Inc., Jan. 2024. [PDF document].
Unknown Author, FOT-930 MaxTester Multifunction Loss Tester—Specification Sheet. EXFO Inc., Version 19, 2013. [PDF document].
Unknown Author, MaxTester 940/945 Fiber Certifier OLTS1'Specification Sheet. EXFO Inc., Version 11, Feb. 2023. [PDF document].
Unknown Author, MaxTester 940/945 Telco OLTS1'Specification Sheet. EXFO Inc., Version 9, Feb. 2023. [PDF document].

* cited by examiner

REFERENCING OPTICAL POWER LOSS MEASUREMENTS USING REFLECTOMETRIC MEASUREMENTS

TECHNICAL FIELD

The present description generally relates to measuring an optical insertion loss value of a device under test (DUT), and more particularly to referencing optical power loss measurement (OPLM) devices such as optical loss test sets (OLTSs).

BACKGROUND

Optical power loss measurements are crucial for proper management of network communication systems. To this end, the Telecommunications Industry Association (TIA) and the American National Standards Institute (ANSI) established standard procedures for measuring power loss values using a light source and a power meter (referred to as the Light Source Power Meter (LSPM) approach). The ANSI/TIA-526-14-B-2010 Standard proposes different methods for referencing an optical power loss measurement system based on the LSPM approach. These referencing and measuring procedures were thus meant to standardize optical power loss measurements associated with a multitude of scenarios that are expected to occur in this field.

The one-cord reference procedure described therein (see Annex A) for instance provides insertion loss measurements having minimized uncertainty and includes insertion losses associated with both end connectors of the DUT. However, the one-cord reference procedure requires that the power meter employs a large-area detector. Conversely, the three-cord reference procedure described therein excludes losses associated with both of the end connectors whereas the two-cord reference procedure includes the loss of one of the end connectors. Both the three-cord and the two-cord reference procedures may be employed with fiber coupled detectors, but they are known to introduce a small bias in the insertion loss measurement (see ANSI/TIA-526-14-B-2010 B.5 and C.5).

Multifunction OLTSs, such as the MaxTester 945 test instruments manufactured by EXFO Inc., are handheld devices that provide insertion loss measurements based on the LSPM approach, which conveniently incorporate measurement of additional parameters such as bi-directional Optical Return Loss (ORL) measurements and fiber-length measurements. However, because the OLTS power detectors are fiber coupled, the one-cord reference procedure is not applicable, and the two-cord and/or the three-cord reference procedures may suffer from the aforementioned small bias.

U.S. Pat. No. 9,749,043 to Perron describes a method for referencing an optical power loss measurement system. This method allows to measure the connector loss along a two-cord reference link. Once the reference is known, along with the hardware that will be used for loss measurement, the method removes the connector loss measured during the reference process.

All the above reference methods are intended for use only when test units are nearby, which adds further steps to the measurement process.

In the context high fiber count testing such as in large datacenters and supercomputers, referencing needs to be simple and efficient. Such short link testing also requires more precision and is therefore sensitive to measurement biases. There therefore remains a need for a simplified referencing method for optical power loss measurement (OPLM) devices such as optical loss test sets (OLTSs).

SUMMARY

There are provided herein methods and systems for referencing an optical power loss measurement (OPLM) system (such as, e.g., a pair optical loss test sets (OLTSs), and methods and systems for measuring an optical insertion loss of an optical fiber link or other optical device under test (DUT) using an OPLM system referenced as such. The herein-provided referencing method combines the capabilities of an OPLM system with that of an Optical Time Domain Reflectometer (OTDR) to provide a method that is referenced to herein as the "reflectometric one-cord method".

The proposed referencing method is simple to use and therefore reduces the risk of error.

The proposed referencing method uses test units that integrate both OTDR and OPLM measurement (or OLTS) capabilities. Minimally, a first test unit, for connection toward a first end of the optical fiber under test, comprises an optical source that is used as the light source in the OPLM measurement. A second test unit, for connection toward a second end of the optical fiber under test, minimally comprises a power meter which is used as the power meter in the OPLM measurement. Either the first or the second test unit comprises an OTDR acquisition device. The reflectometric one-cord reference measures the connector loss along the reference link using OTDR capabilities of the test unit(s). Once the power reference of the OPLM devices is obtained, the reflectometric one-cord reference method may determine the optical insertion loss of the DUT while eliminating the measured connector loss.

In some embodiments, both test units integrate OPLM and OTDR measurement capabilities so as to allow bidirectional testing. Each test unit comprises an optical source that is used as the light source in the OPLM measurement, and which is also used as the OTDR source in the OTDR measurement, as well as a power meter which is used as the power meter in the OPLM measurement. For example, an optical switch or other coupling device may be used to selectively connect the test port of each test unit to either the source/OTDR or the power meter.

The method leverages OTDR technologies to deliver a reflectometric one-cord-equivalent reference.

It employs a simple test cord connection, without complex multi-step connection requirement. It may combine reference and test cord verification in a single step.

Advantageously, the reflectometric one-cord method obviates the need for a comprehensive multi-step assistant wizard (necessary to avoid user errors in the one-cord, two-cord and three-cord references procedures) because a single connection is needed to complete the reference procedure.

Also, in the prior art one-cord reference, connector incompatibility between the DUT and the test units may simply prevent from applying a one-cord reference in some instances. An adapter cord is needed for such cases which will impact the measurement uncertainty. The reflectometric one-cord-equivalent reference eliminates connector compatibility issues with the use of a substitution cord, which is used to adapt connectors while still providing a one-cord equivalent reference. Again, using OTDR capabilities of the test unit(s), the reflectometric one-cord reference measures the connection loss along the reference link, which includes the substitution cord. Once the power reference of the OPLM devices is obtained, the reflectometric one-cord reference method eliminates the measured connection loss (including the substitution cord) to obtain a corrected reference and then measure the insertion loss of the DUT.

In accordance with one aspect, there is provided a method for measuring an optical insertion loss of an optical device under test (DUT) using an optical power loss measurement (OPLM) system comprising a first test unit comprising a first optical source, a second test unit comprising a first power meter and a first optical time domain reflectometer (OTDR) acquisition device in one of the first and the second test unit. The method comprises the steps of:

- measuring a reference power value P1 of the OPLM system, the reference power value P1 resulting from the propagation of light from the first optical source to the first power meter via a reference optical waveguide link connected between the first test unit and the second test unit and comprising a launch test waveguide TC1, a receive test waveguide TC2 and at least one optical connector C3 therebetween;
- performing an OTDR acquisition toward the reference optical waveguide link using the first OTDR acquisition device to obtain a first OTDR trace;
- using at least the first OTDR trace, determining a connection loss value Lc corresponding to the at least one optical connector C3;
- measuring a measurement power value P2 resulting from the propagation of light from the first optical source to the first power meter via a test link connected between the first test unit and the second test unit and comprising the DUT connected in series between the launch test waveguide TC1 and the receive test waveguide TC2; and
- determining a first value of the optical insertion loss L of the DUT based on the reference power value P1, the measurement power value P2 and the connection loss value Lc as determined from at least the first OTDR trace.

In accordance with another aspect, there is provided an optical power loss measurement (OPLM) system to be used for measuring an optical insertion loss of an optical device under test (DUT). The system comprises:

- a first test unit comprising:
  - a first connector interface; and
  - a first optical source;
  - wherein the first optical source and the first OTDR acquisition device are both optically coupled to the first connector interface;
- a second test unit comprising:
  - a second connector interface; and
  - a first power meter optically coupled to the second connector interface;
- a first optical time domain reflectometer (OTDR) acquisition device integrated in one of the first test unit and the second test unit; and
- a processing unit in communication with the first test unit and the second test unit and configured to perform the steps of:
  - receiving a reference power value P1 of the OPLM system measured using the first power meter and resulting from the propagation of light from the first optical source to the first power meter via a reference optical waveguide link connected between the first test unit and the second test unit and comprising a launch test waveguide TC1, a receive test waveguide TC2 and at least one optical connector C3 therebetween;
  - receiving a first OTDR trace obtained from a first OTDR acquisition performed toward the reference optical waveguide link using the first OTDR acquisition device;
  - using at least the first OTDR trace, determining a connection loss value Lc corresponding to the at least one optical connector C3;
  - receiving a measurement power value P2 measured using the first power meter and resulting from the propagation of light from the first optical source to the first power meter via a test link connected between the first test unit and the second test unit and comprising the DUT connected in series between the launch test waveguide TC1 and the receive test waveguide TC2; and
  - determining a first value of the optical insertion loss L of the DUT based on the reference power value P1, the measurement power value P2 and the connection loss value Lc as determined from at least the first OTDR trace.

In accordance with another aspect, there is provided a method for referencing an optical power loss measurement (OPLM) system to be used for measuring an optical insertion loss of an optical device under test (DUT) using and comprising a first test unit comprising a first optical source, a second test unit comprising a first power meter and a first optical time domain reflectometer (OTDR) acquisition device in one of the first and the second test unit. The method comprises the steps of:

- measuring a reference power value P1 of the OPLM system, the reference power value resulting from the propagation of light from the first optical source to the first power meter via a reference optical waveguide link connected between the first test unit and the second test unit and comprising a launch test waveguide TC1, a receive test waveguide TC2 and at least one optical connector C3 therebetween;
- performing an OTDR acquisition toward the reference optical waveguide link using the first OTDR acquisition device to obtain a first OTDR trace;
- using at least the first OTDR trace, determining a connection loss value Lc corresponding to the at least one optical connector C3; and
- determining a corrected reference power value R based on the reference power value P1 and the connection loss value Lc.

In some embodiments, the method or system may comprise one or more of the following features, considered alone or according to all technically possible combinations.

In some embodiments, a corrected reference power value R may be determined based on the reference power value P1 and the connection loss value Lc; and the first value of the optical insertion loss L of the DUT may be determined based on the measurement power value P2 and the corrected reference power value R.

In some embodiments, said determining a first value of the optical insertion loss L of the DUT may include adjusting a responsivity of the first power meter in accordance with the connection loss value Lc before measuring the measurement power value P2 and determining a value of the optical insertion loss L of the DUT based on the reference power value P1 and the measurement power value P2.

In some embodiments, the reference optical waveguide link may further include a substitution waveguide SC connected in series between the launch test waveguide TC1 and the receive test waveguide TC2; wherein the at least a one optical connector includes the substitution waveguide SC, a first optical connector C3 between the launch test waveguide TC1 and the substitution waveguide SC and a second optical connector C4 between the substitution waveguide SC and the receive test waveguide TC2; and wherein the step of determining the connection loss value Lc may determine the connection loss Lc as corresponding to at least the first optical connector C3, the substitution waveguide SC and the second optical connector C4.

In some embodiments, the first OTDR acquisition device is may be included in the first test unit, the second test unit may further include a second OTDR acquisition device and a second optical source and an OTDR acquisition may be performed toward the reference optical waveguide link using the second OTDR acquisition device to obtain a second OTDR trace; said determining a connection loss value Lc corresponding to the at least one optical connector C3 may be made using at least the first OTDR trace and the second OTDR trace.

In some embodiments, the first test unit further may include a second power meter.

In some embodiments, a second reference power value P1' of the OPLM system may be measured, the second reference power value resulting from the propagation of light from the second optical source to the second power meter via the reference optical waveguide link; a second measurement power value P2' may be measured, resulting from the propagation of light from the second optical source to the second power meter via the test link; and a second value of the optical insertion loss L' of the DUT may be determined based on the second reference power value P1', the second measurement power value P2' and the connection loss value Lc.

In some embodiments, the first OTDR acquisition device may be included in the first test unit; wherein said measuring a reference power value P1 and said measuring a measurement power value P2 may include operating the first optical source in continuous mode; and wherein said performing an OTDR acquisition may include operating the first optical source in pulsed mode to perform the first OTDR acquisition.

In some embodiments, the first OTDR acquisition device may be included in the first test unit and the second test unit may further include a second OTDR acquisition device and a second optical source, wherein the second OTDR acquisition device, the second optical source and the first power meter are optically coupled to the second connector interface; the processing unit may further be configured to perform the step of: receiving a second OTDR trace obtained from an second OTDR acquisition performed toward the reference optical waveguide link using the second OTDR acquisition device; wherein said determining a connection loss value Lc corresponding to the at least one optical connector C3 is made using at least the first OTDR trace and the second OTDR trace.

In some embodiments, the second OTDR acquisition device may include a second pulse generator coupled to drive the second optical source to generate an OTDR test signal including one or more test light pulses.

In some embodiments, the first test unit may further include a second power meter optically coupled to the first connector interface.

In some embodiments, the first test unit may further include a first optical switch to selectively couple toward the first connector interface either the second power meter or the first optical source and the first OTDR acquisition device; and the second test unit may further include a second optical switch to selectively couple toward the second connector interface either the first power meter or the second optical source and the first OTDR acquisition device.

In some embodiments, the second optical source may operate in continuous mode to measure the reference power value P1' and the measurement power value P2' may operate in pulsed mode to perform the second OTDR acquisition.

In this specification, unless otherwise mentioned, word modifiers such as "substantially" and "about" which modify a value, condition, relationship or characteristic of a feature or features of an embodiment, should be understood to mean that the value, condition, relationship or characteristic is defined to within tolerances that are acceptable for proper operation of this embodiment in the context its intended application. In particular, the term "about" generally refers to a range of numbers that one skilled in the art would consider equivalent to the stated value (e.g., having the same or an equivalent function or result). In some instances, the term "about" may mean a variation of ±10% of the stated value. It is noted that all numeric values used herein are assumed to be modified by the term "about", and that all conditions, relationships or characteristics used herein are assumed to be modified by the term "substantially", unless stated otherwise. The term "between" is used herein to refer to a range of numbers or values defined by endpoints is intended to include both endpoints, unless stated otherwise.

In the present description, and unless stated otherwise, the terms "connected", "coupled" and variants and derivatives thereof refer to any connection or coupling, either direct or indirect, between two or more elements. The connection or coupling between the elements may be mechanical, physical, operational, electrical, optical or a combination thereof.

In the present description, the terms "light" and "optical" are used to refer to radiation in any appropriate region of the electromagnetic spectrum. More particularly, the terms "light" and "optical" are not limited to visible light, but can include, for example, the infrared wavelength range. For example, in some embodiments, the test optical signals generated by the source assembly for polarity and continuity verification can have a wavelength band lying somewhere in the range from about 600 nm to about 1700 nm. Those skilled in the art will understand, however, that this wavelength range is provided for illustrative purposes only and that the present techniques may operate beyond this range.

Further features and advantages of the present invention will become apparent to those of ordinary skill in the art upon reading of the following description, taken in conjunction with the appended drawings.

The following description is provided to gain a comprehensive understanding of the methods, apparatus and/or systems described herein. Various changes, modifications, and equivalents of the methods, apparatuses and/or systems described herein will suggest themselves to those of ordinary skill in the art. Description of well-known functions and structures may be omitted to enhance clarity and conciseness.

Although some features may be described with respect to individual exemplary embodiments, aspects need not be limited thereto such that features from one or more exemplary embodiments may be combined with other features from one or more other exemplary embodiments.

BRIEF DESCRIPTION OF THE DRAWINGS

FIG. 2 comprises FIG. 2A and FIG. 2B which are block diagrams illustrating a method for measuring an optical insertion loss of an optical device under test (DUT) using an optical power loss measurement (OPLM) system, in accordance with one embodiment where the DUT comprises complementary end connector interfaces, wherein

FIG. 3 comprises FIG. 3A and FIG. 3B which are block diagrams illustrating a method for measuring an optical insertion loss of an optical device under test (DUT) using an optical power loss measurement (OPLM) system, in accordance with another embodiment where the DUT comprises incompatible end connector interfaces, wherein

FIG. 6 comprises FIG. 6A and FIG. 6B wherein

FIG. 7 comprises FIG. 7A and FIG. 7B wherein

FIG. 8 comprises FIG. 8A and FIG. 8B wherein

FIG. 9 comprises FIG. 9A and FIG. 9B wherein FIG. 8B is a graph illustrating an OTDR trace obtained from direction B to A in the referencing step of FIG. 9A.

Figure 1:
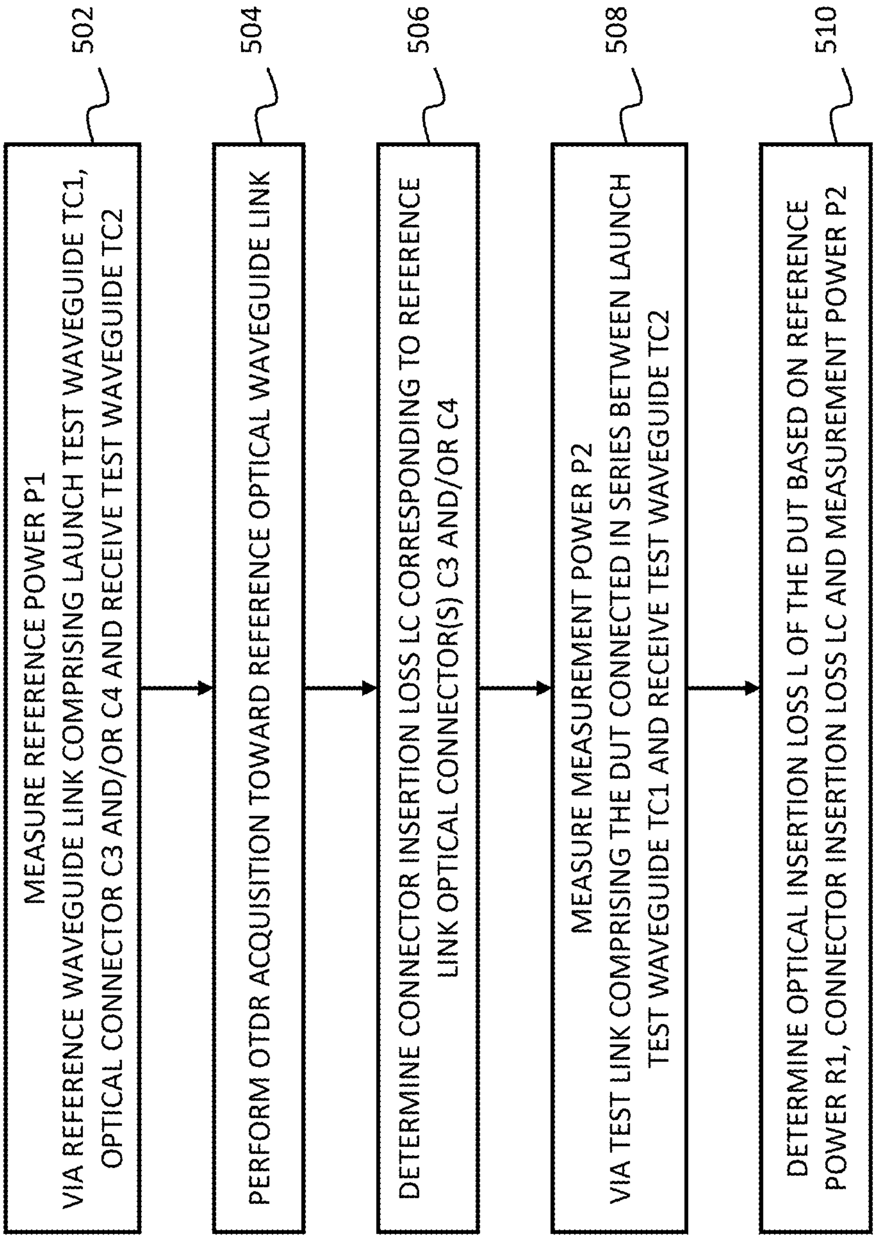
FIG. 1 is a flow chart illustrating a method for measuring an optical insertion loss of an optical device under test (DUT) using an optical power loss measurement (OPLM) system, in accordance with one embodiment.

It will be noted that throughout the drawings, like features are identified by like reference numerals. In the following description, similar features in the drawings have been given similar reference numerals and, to not unduly encumber the figures, some elements may not be indicated on some figures if they were already identified in a preceding figure. It should be understood herein that elements of the drawings are not necessarily depicted to scale, since emphasis is placed upon clearly illustrating the elements and structures of the present embodiments. Some mechanical or other physical components may also be omitted in order to not encumber the figures.

Furthermore, throughout the drawings, and especially in block diagrams and flowcharts, dash lines are generally used to indicate that a component is intended to be optional.

DETAILED DESCRIPTION

The methods and systems described herein can be used for characterizing optical fiber links or other optical devices, for referencing an OPLM system and for determining an insertion loss value of a DUT using the referenced OPLM system.

The OPLM system can be provided in the form of two test units optically coupled to one another via a test link including the DUT. These test units can be provided in the form of Optical Loss Test Sets (OLTSs) or in the form of two multifunction loss testers, for instance. The components and configuration of the test units and system will be described below, however, it should be understood that the test units of the OPLM system may be configured to measure global values of the DUT including bi-directional losses, bi-directional optical return losses (ORL) and the length of the DUT. These bi-directional measurements are allowed if each of the test units has a fiber coupled optical source and a fiber coupled power meter. These components are optically coupled to a connector interface of the test units so that the optical source can transmit light towards the connector interface while light incoming from the connector interface is detected using the fiber coupled power meter.

Also, in an embodiment, the DUT is an optical fiber link, whereas in another embodiment, the DUT can include an optical waveguide link such as a planar waveguide and/or optical components.

It has been found that, in the context of such OPLM systems, the standard one-cord reference procedure established by the Telecommunications Industry Association (TIA) may not be applicable when power measurements at each of the OPLM devices are performed via fiber coupled detectors, instead of large-area detectors (as in OLTSs).

Moreover, it is known that the one-cord reference procedure is more accurate than the two-cord or the three-cord reference procedures since the latter two tend to add a bias in the insertion loss value measurements. Indeed, the two-cord reference procedure includes a prior step of measuring a reference power value of the optical measurement system by propagating light from the optical source to the power meter via a link including a first reference test cord connected to a second reference test cord via a connector. The DUT is then inserted between the first and second reference optical waveguides to measure a test link power value. Then, the insertion loss value can be obtained by subtracting the reference power value from the test link power value. With this procedure, it is known that the measured insertion loss value includes the loss corresponding to one end connector but may also comprise a non-zero bias value associated with a difference between the loss of the connector of the reference optical waveguide link and the loss of each of the end connectors of the DUT (see ANSI/TIA-526-14-B-2010 C.5).

Scenarios where the DUT is relatively long (e.g. >20 km) and where the acceptable loss is moderate (4-6 dB) were the main test-and-measurement scenarios considered several years ago when these standard procedures were conceived. The insertion loss associated with the end connectors and the bias associated with the two- and the three-cord reference procedures were considered negligible in comparison with the insertion loss value associated with the DUT. For this reason, the standard procedures typically neglected to take into account the connector loss value associated with the connector of the reference optical waveguide link.

Nowadays, loss measurements are increasingly being carried out on relatively short optical fiber links (e.g. <2 km), such as those often found in "enterprise", data-centers, and Fiber-To-The-X (FTTX) applications (the generic X may represent N for node, B for business, H for home, or A for antenna, etc.). In these contexts, the DUT may exhibit a low loss (e.g. 0.4-0.6 dB), and hence losses stemming from the test cord connection may dominate that of the DUT itself. Consequently, in order to avoid unacceptable levels of measurement uncertainty, these connection-related losses should be properly taken into account. If such test cord connection losses are not properly taken into consideration, the measured values can be totally unreliable, even giving rise to an apparent negative loss value, for instance.

The method and system described herein allow for correcting a reference power value of the OPLM system using an accurate measurement of the connector loss value. By doing so, the provided methods enable measurement of the insertion loss value of the DUT with a level of uncertainty similar to that which can be provided using the one-test cord procedure while also allowing measurements to be made with a fiber coupled power meter and therefore allowing other types of measurements (bi directional loss, ORL, etc.) to be performed on the DUT.

In accordance with one aspect, there is provided a new referencing method which combines the capabilities of an OPLM system with that of an Optical Time Domain Reflectometer (OTDR) to provide a method that is referenced to herein as the "reflectometric one-cord method".

The proposed referencing method is simple to use and therefore reduces the risk of error.

The proposed referencing method uses test units that integrate both OTDR and OPLM measurement (or OLTS) capabilities. Minimally, a first test unit, for connection toward a first end of the optical fiber under test, comprises an optical source that is used as the light source in the OPLM measurement. A second test unit, for connection toward a second end of the optical fiber under test, minimally comprises a power meter which is used as the power meter in the OPLM measurement. Either the first or the second test unit comprises an OTDR acquisition device. The reflectometric one-cord reference measures the connector loss along the reference link using OTDR capabilities of the test unit(s). Once the power reference of the OPLM devices is obtained, the reflectometric one-cord reference method eliminates the measured connector loss to obtain a corrected insertion loss measurement.

Optical Time-Domain Reflectometry (OTDR—also used to refer to the corresponding device) is widely employed for characterization of optical fiber links. OTDR is a diagnostic technique where a test signal in the form of light pulses is launched in the optical fiber link under test and the return light signal, arising from backscattering and reflections along the link, is detected and analyzed. The acquired power level of the return light signal as a function of time is referred to as an "OTDR trace" or a "reflectometric trace", where the time scale is representative of distance between the OTDR acquisition device and a point along the fiber link. Herein, the process of launching a test signal and acquiring the return light signal to obtain therefrom an OTDR trace is referred to as an "OTDR acquisition".

In the following description, techniques that are generally known to the ones skilled in the art of OTDR measurement and OTDR trace processing and analysis will not be explained or detailed and in this respect, the reader is referred to available literature in the art. Such techniques that are considered to be known may include, e.g., signal processing methods for identifying and characterizing events from an OTDR trace. Similarly, an OTDR acquisition device is understood to comprise conventional optical hardware and electronics as known in the art for performing OTDR acquisitions on an optical fiber link.

Each OTDR acquisition is understood to refer to the actions of propagating a test signal comprising one or more test light pulses having the same pulse width in the optical fiber link, and detecting corresponding return light signal from the optical fiber link as a function of time. A test light-pulse signal travelling along the optical fiber link will return towards its point of origin either through (distributed) backscattering or (localized) reflections. The acquired power level of the return light signal as a function of time is referred to as the OTDR trace, where the time scale is representative of distance between the OTDR acquisition device and a point along the optical fiber link. Light acquisitions may be repeated with varied pulse width values to produce a separate OTDR trace for each test pulse width.

One skilled in the art will readily understand that in the context of OTDR methods and systems, each light acquisition generally involves propagating a large number of substantially identical light pulses in the optical fiber link and averaging the results. In this case, the result obtained from averaging will herein be referred to as an OTDR trace. It will also be understood that other factors may need to be controlled during the light acquisitions or from one light acquisition to the next, such as gain settings, pulse power, etc. as is well known to those skilled in the art.

OTDR technology can be implemented in different manners and advanced OTDR technology typically involves multi-pulse acquisitions and analysis whereby the OTDR acquisition device makes use of multiple acquisitions performed with different pulse widths in order to provide different spatial resolutions and noise level conditions for event detection and measurement along the optical fiber link under test and provide a complete mapping of the optical fiber link. As such, an OTDR measurement may comprise multiple OTDR acquisitions performed with different pulse widths or other varying conditions. One or more OTDR traces acquired for a given OTDR measurement may be saved as part of an OTDR measurement data file or files.

FIGS. 1, 2 and 3 illustrates a method for measuring an optical insertion loss of an optical device under test (DUT) using an optical power loss measurement (OPLM) system, in accordance with one embodiment. As illustrated in FIGS. 2 and 3, the method employs a first test unit 10 which minimally comprises an optical source and a second test unit 20 which minimally comprises a power meter. It also comprises an OTDR acquisition device which may be integrated in either the first test unit 10 or the second test unit 20. In the embodiment of FIGS. 2 and 3, the OTDR acquisition device is integrated in the first test unit 10, which (as will be described hereinafter with reference to FIG. 4) allows using the optical source as both the OTDR source and the light source of the optical power loss measurement.

Figure 2A:
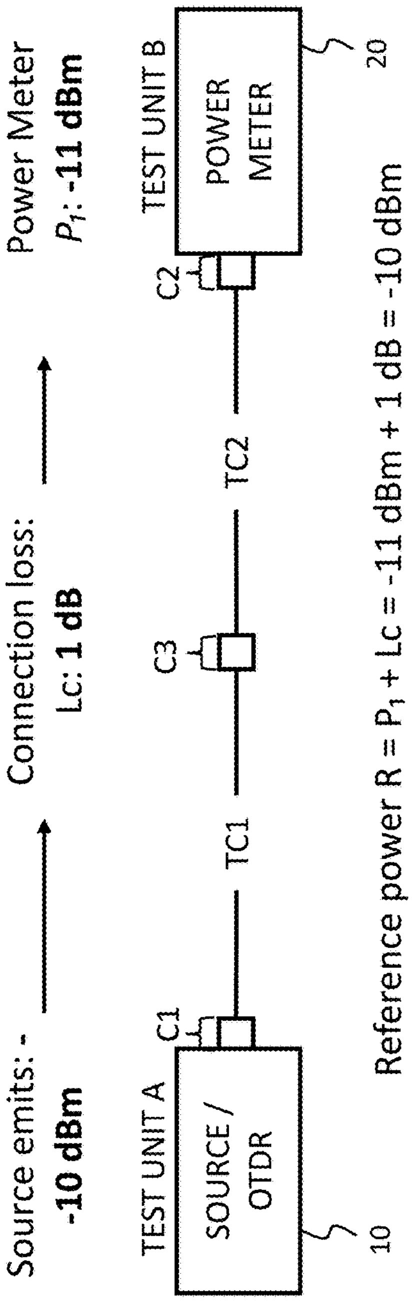
FIG. 2A illustrates the referencing step and FIG. 2B illustrates the measurement step.

Referring to FIG. 1, in step 502, a reference power value P1 of the OPLM system is measured as illustrated in FIG. 2A, by connecting the first and second test unit 10, 20 together via a reference optical waveguide link comprising a launch test cord TC1 (also referred to herein as the "launch test waveguide"), a receive test cord TC2 (also referred to herein as the "receive test waveguide") and at least one optical connector C3 therebetween. The reference power value P1 therefore results from the propagation of light from the optical source of the first test unit 10 to the power meter of the second test unit 20 via the reference link.

As per the conventional two-cord reference method (see ANSI/TIA-526-14-B-2010 C.5), it is this reference power value P1 that would be directly used (L [dB]=P1 [dBm]−P2 [dBm]). But as explained hereabove, using the two-cord reference method, the measured insertion loss value includes the loss corresponding to one end connector but may also comprise a non-zero bias value associated with a difference between the loss of the connector of the reference optical waveguide link and the loss of each of the end connectors of the DUT.

In order to eliminate this bias, in step 504, an OTDR acquisition is performed toward the reference optical waveguide link as illustrated in FIG. 2A using the OTDR acquisition device (herein integrated in the first test unit 10) to obtain at least a first OTDR trace. Of course, as known in the art, multiple OTDR acquisitions may be performed as necessary, e.g., using varied acquisition parameters.

In step 506, using the acquired OTDR trace, a value of the connection insertion loss Lc corresponding to the at least one optical connector C3 is determined. The connection loss Lc is determined by analyzing the OTDR trace as known in the art.

As illustrated in FIG. 2A, a corrected reference power value R may then be obtained based on the reference power value P1 and the connection insertion loss value Lc.

In other words, a reference power measurement P1 is performed using the light source-power meter method using the optical source from the first test unit 10 and the power meter from the second test unit 20, by propagating light through test cord TC1 and test cord TC2 (see FIG. 2A). However, the reference power value P1 is biased by an offset value corresponding to the connection loss value Lc. But the reference power value P1 can be corrected using the connection loss value Lc in order to avoid this bias. The connection loss value Lc is obtained from the OTDR measurement (in this case a unidirectional OTDR measurement). Then, in accordance with the method for referencing the optical power loss measurement system, a corrected reference power value R may be obtained as follows:

$$R\ [\text{dBm}]=P1\ [\text{dBm}]+\text{Lc}\ [\text{dB}] \quad (1)$$

For example, as per FIG. 2A:

Reference power value: P1=−11 dBm

Connection loss: Lc=1 dB

Corrected reference power: R=P1+Lc=−11 dBm+1 dB=−10 dBm

According to the conventional one-cord referencing method, the insertion loss measurement of the DUT should include the first and last connectors C5, C6 in the insertion loss budget. To do this, the connection loss Lc of the connector C3 between the test cords TC1 and TC2 should be added to the reference power reading. When referencing the power with TC1 and TC2 connected, the reference power value includes the loss of one (1) connection between test cord. By adding the connection loss to the power reading, this will have the effect of excluding the connectors from the reference power. Adding the connection loss value might be counterintuitive because the goal is to exclude it from the measured power. Indeed, contrary to logic, optical loss is not expressed as a negative value. In the optical domain, optical loss is denoted by a positive value and gain by a negative value. This explains that the loss value to be excluded is added to the power.

Figure 2B:
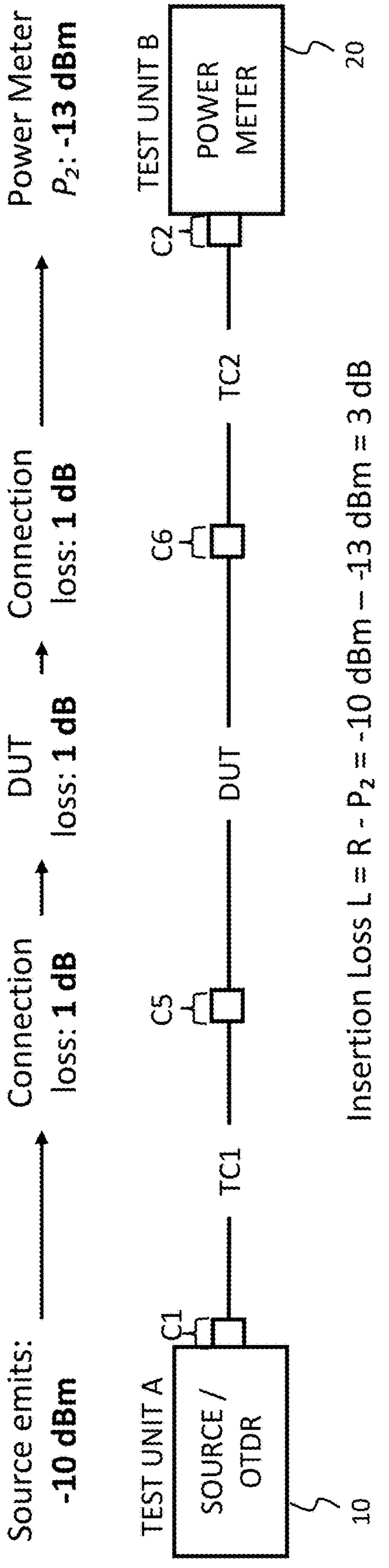

Then, in step 508, a measurement power value P2 is measured as illustrated in FIG. 2B, by connecting the DUT connected in series between test cord TC1 and test cord TC2. In other word, connector C3 is disconnected to insert the DUT in the test link. The measurement power value P2 therefore results from the propagation of light from the optical source of the first test unit 10 to the power meter of the second test unit 20 via the test link.

It is important to note that in order to obtain a reliable reference, it is strongly recommended to not disconnect test cord TC1 and test cord TC2 from the first test unit 10 and the second test unit 20, respectively, between the reference measurement, the OTDR measurement and the DUT measurement.

Finally, in step 510, the optical insertion loss L of the DUT may be determined based on the measurement power value P2 and the corrected reference power value R as with the conventional two-cord reference:

$$L\ [\text{dB}]=R\ [\text{dBm}]-P2\ [\text{dBm}] \quad (2)$$

For example, as per FIG. 2B:

Measurement power: P2=−13 dBm

Optical insertion loss: L=R−P2=−10 dBm−−13 dBm=3 dB

It is noted that the measurement power value P2 may also be directly determined from the reference power value P1, the measurement power value P2 and the connection loss value Lc:

$$L\ [\text{dB}]=P1\ [\text{dBm}]-P2\ [\text{dBm}]+\text{Lc}\ [\text{dB}] \quad (3)$$

For example, as per FIG. 2B:

Optical insertion loss: L=P1−P2+Lc=−11 dBm−−13 dBm+1 dB=3 dB

In yet another embodiment, in step 510, instead of correcting the reference, the optical insertion loss L of the DUT may be obtained by adjusting a responsivity of the power meter in accordance with the connection loss value Lc obtained in step 504, in order to apply a correction to power values measured using the power meter. For example, as per FIG. 2B, the responsivity is adjusted so to obtain a reference power value P1 of −10 dBm.

The measurement power value P2 obtained with such adjusted responsivity may then be used to determine the optical insertion loss L of the DUT:

$$L\ [\text{dB}]=P1\ [\text{dBm}]-P2\ [\text{dBm}] \quad (4)$$

For example, as per FIG. 2B:

Adjusted measurement power: P2=−14 dBm

Optical insertion loss: L=P1−P2=−11 dBm−−14 dBm=3 dB

Throughout this document, power values and power ratios are expressed in dBm and dB, respectively. However, one skilled in the art will understand that the measured power values P1, P2 and optical insertion loss value L can equivalently be expressed on a linear scale.

It should be noted that although the embodiments described herein employ a fiber coupled power meter, large-area detection could be used just as well.

FIG. 2 illustrates the referencing method and the applicable connection procedure in applications where the DUT has complementary end connector interfaces. In such cases, the referencing step (see FIG. 2A) employs two test cords TC1 and TC2 having end connector interfaces that match those of the DUT, such that they can be disconnected to insert the DUT in-between for the measurement step (see FIG. 2B). In other words, the DUT may simply be inserted between test cord TC1 and TC2.

Also, in the prior art one-cord reference, connector incompatibility between the DUT and the test units may simply prevent from applying a one-cord reference in some instances. The reflectometric one-cord-equivalent reference eliminates connector compatibility issues with the use of a substitution cord, which is used to adapt connectors while still providing a one-cord equivalent reference.

Figure 3A:
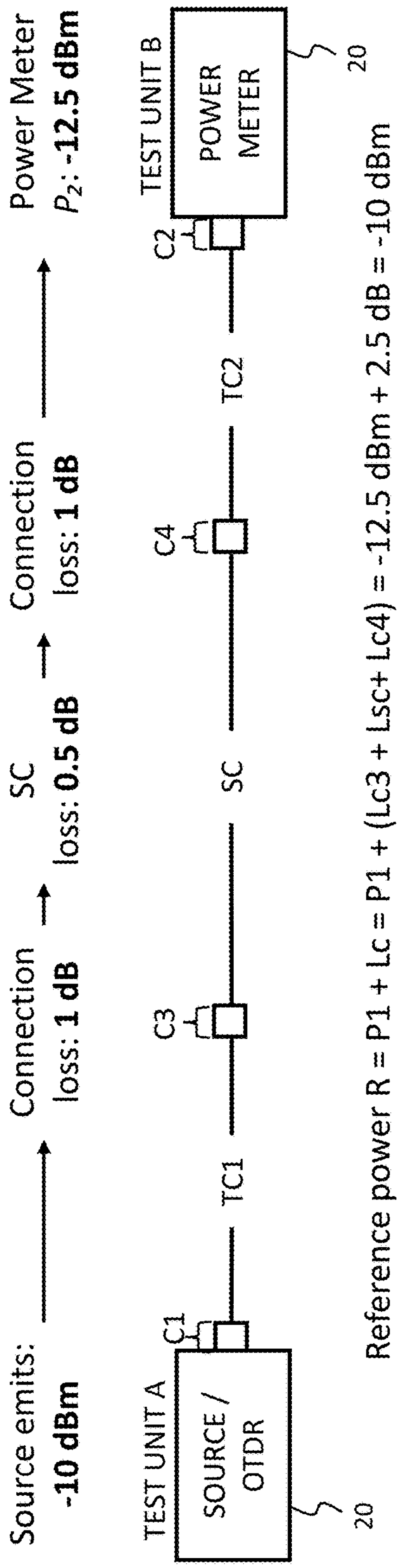
FIG. 3A illustrates the referencing step using a substitution cord and FIG. 3B illustrates the measurement step.
Figure 3B:
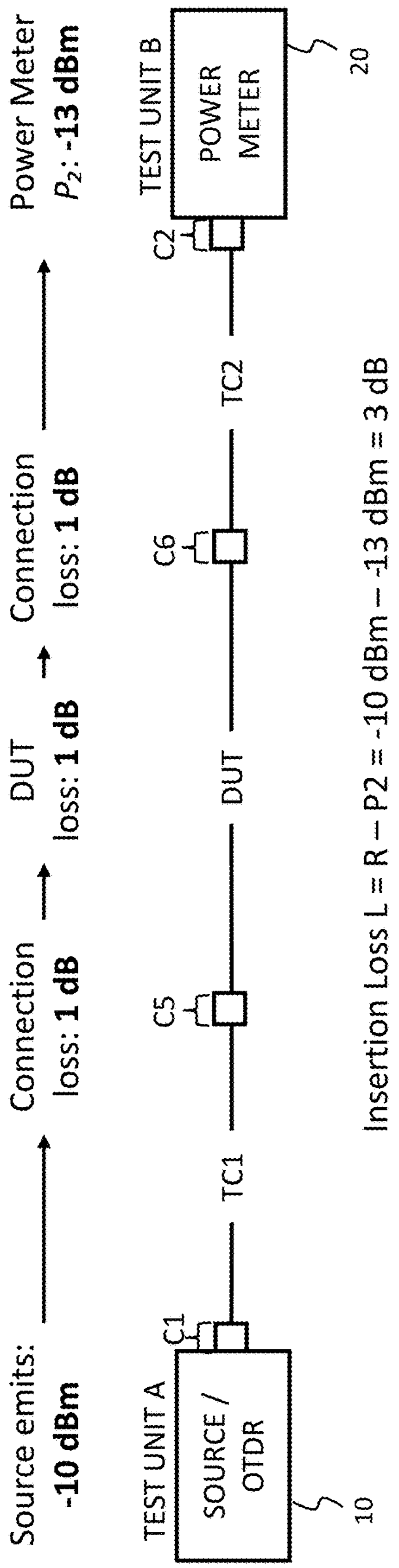

FIG. 3 illustrates the referencing method and the applicable connection procedure in applications where the DUT has incompatible end connector interfaces. In such cases, the referencing and measurement steps employ two test cords TC1, TC2 having end connector interfaces that match those of the DUT (see FIG. 3B), such that the DUT can be inserted between test cord TC1 and test cord TC2 for the measurement step. However, in order to perform the referencing step (see FIG. 3A), a substitution cord SC needs to be inserted between test cord TC1 and test cord TC2. The substitution cord SC has end connector interfaces that replicate those of the DUT.

In any case, the reflectometric one-cord reference allows to characterize the connection loss Lc at time of reference and correct the reference power level value to remove its effect in order to obtain a one-cord equivalent reference. This is made possible by the OTDR acquisition, which allow to fully characterize reference link including the connection loss Lc (C3+SC+C4). Once the power reference of the OPLM devices is obtained, the reflectometric one-cord reference method eliminates the measured connection loss Lc to obtain a corrected insertion loss measurement.

In such case, the measurement procedure goes as follows. In step 502, the reference power value P1 of the OPLM system is measured as illustrated in FIG. 3A, by connecting the first and second test unit 10, 20 together via a reference optical waveguide link comprising a launch test cord TC1, a substitution cord SC and a receive test cord TC2. In this case, the at least a one optical connector comprises the substitution waveguide SC, a first optical connector C3 between test cord TC1 and the substitution waveguide SC, and a second connector C4 between the substitution waveguide SC and test cord TC2. The reference power value P1 therefore results from the propagation of light from the optical source of the first test unit 10 to the power meter of the second test unit 20 via the reference link.

In step 504, an OTDR acquisition is performed toward the reference optical waveguide link as illustrated in FIG. 3A using the OTDR acquisition device (herein integrated in the first test unit 10) to obtain at least a first OTDR trace.

In step 506, using the acquired OTDR trace, a value of the connection insertion loss Lc corresponding to optical connector C3, the substitution waveguide SC and optical connector C4 is determined. The connection loss Lc is determined by analyzing the OTDR trace as known in the art:

$$Lc\ [dB]=Lc3\ [dB]+Lsc\ [dB]+Lc4\ [dB] \tag{5}$$

wherein Lc3 is the connection loss of C3, Lsc the connection loss of the substitution cord SC, and Lc4 the connection loss of C4.

As illustrated in FIG. 3A, a corrected reference power value R may then be obtained based on the reference power value P1 and the connection loss value Lc as follows:

$$R\ [dBm]=P1\ [dBm]+Lc\ [dB] \tag{6}$$

$$R\ [dBm]=P1\ [dBm]+Lc3\ [dB]+Lsc\ [dB]+Lc4\ [dB] \tag{7}$$

For example, as per FIG. 3A:

Reference power value: P1=−12.5 dBm

Connection loss: Lc=Lc3+Lsc+Lc4=2.5 dB

Corrected reference power: R=P1+Lc=−12.5 dBm+2.5 dB=−10 dBm

Then, in step 508, a measurement power value P2 is measured as illustrated in FIG. 3B, by connecting the DUT connected in series between test cord TC1 and test cord TC2. In other word, the substitution cord SC is removed to insert the DUT in the test link. The measurement power value P2 therefore results from the propagation of light from the optical source of the first test unit 10 to the power meter of the second test unit 20 via the test link.

Finally, in step 510, the optical insertion loss L of the DUT may be determined based on the measurement power value P2 and the corrected reference power value R as:

$$L\ [dB]=R\ [dBm]-P2\ [dBm] \tag{2}$$

For example, as per FIG. 3B:

Measurement power: P2=−13 dBm

Optical insertion loss: L=R−P2=−10 dBm−−13 dBm=3 dB

Therefore, the reflectometric one-cord reference is applicable regardless of the type of the optical connector interfaces for the DUT. The reflectometric one-cord reference can also have the same benefits in terms of optical characteristics, precision, and a level of uncertainty, as the traditional one-cord method, which is the most recommended in the industry. No matter the different conditions related to DUT, the inclusion of the first and last connectors of the DUT is no longer an issue.

By having all test cords connected during the referencing step, test cord verification may also be performed in this same step based on the OTDR acquisition. For example, test cord verification may comprise measuring the insertion loss and length of each test cord to ensure they are within acceptable values. Also, internal fibers in both test units may allow the verification of the input connector C1 and output connector C2, in addition to optical connector C3. In some embodiments, the test units may inform the user on which connector should be cleaned or replaced if needed. In one connection step, the reference power is recorded, the test cords and test connections can be verified and the connection loss between test cords can be subtracted to have a one-cord equivalent.

It also allows to distinctly measure the test cord connections losses, so that they can be included or excluded from the reported insertion loss of the DUT. For example, a three-cord equivalent insertion loss may be reported by excluding losses associated with both end connectors. This may be accomplished by subtracting the end connectors insertion losses from the one-cord equivalent insertion loss measurement.

It is noted that using the substitution cord referencing allows to reference test units that would be distant from one another because there is no limit in the length of the substitution cord. Interestingly, if multiple parallel optical fiber links are to be tested (multiple fibers of an optical fiber cable or multiple cables), the reference step can be performed using one of the optical fiber links as the substitution cord SC, which reference can then be applied when measuring all the other optical fiber links. The method therefore provides the means to reference distant test units with the same method as nearby test units.

Figure 4:
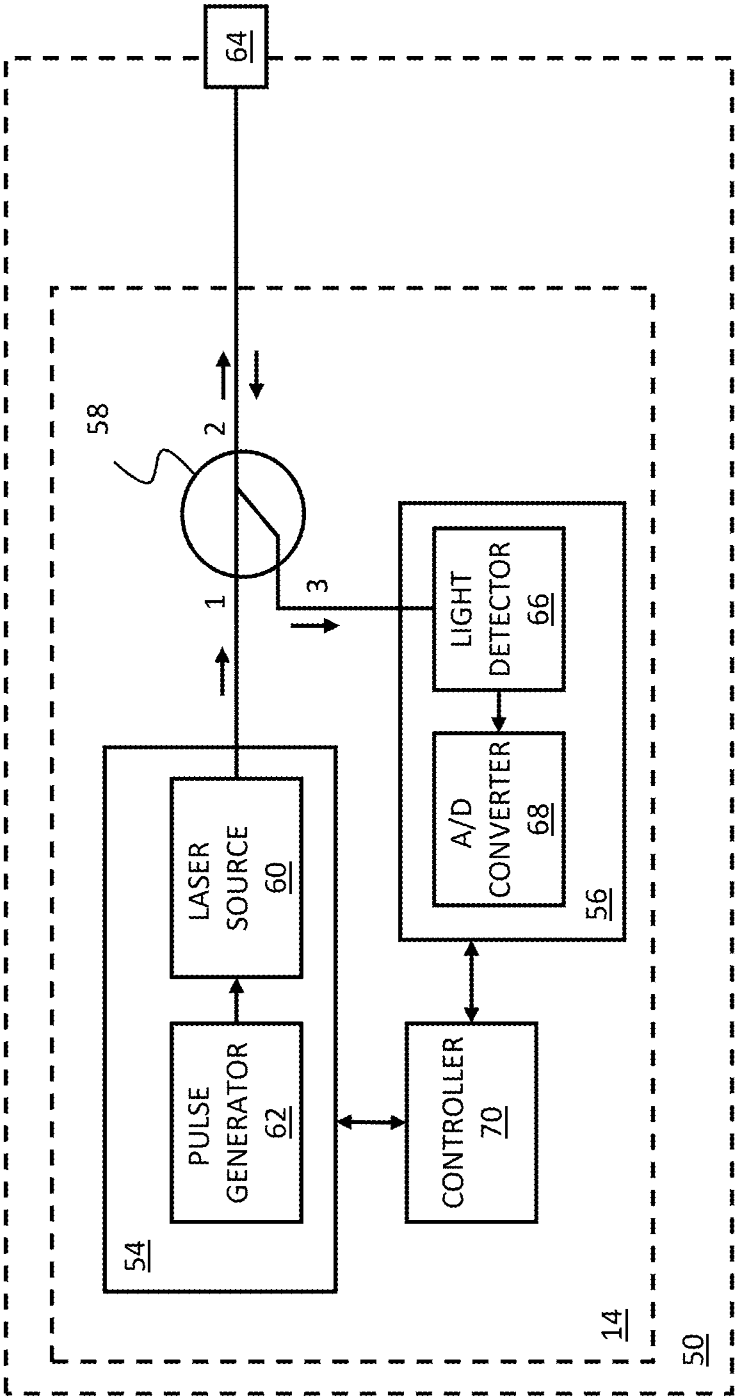
FIG. 4 is a block diagram illustrating the optical components the first test unit of the OPLM systems of FIGS. 2 and 3, in accordance with one embodiment adapted for unidirectional OPLM measurement.

FIG. 4 illustrates the optical components of an embodiment of a test unit 50 which may embody the first test unit 10 of the OPLM systems of FIGS. 2 and 3.

The test unit 50 comprises an optical source/OTDR assembly 14 which is connectable toward the DUT via an output interface 64, for performing the reference and the measurement steps toward the DUT. The test unit 50 comprises conventional optical hardware and electronics as known in the art for generating OPLM test light as well as performing OTDR acquisitions over an optical fiber link.

The test unit 50 comprises light generating assembly 54, a detection assembly 56, a directional coupler 58 and a controller.

The light generating assembly 54 is embodied by a laser source 60 which may be driven by a pulse generator 62 to generate the OTDR test signal comprising test light pulses having desired characteristics. In this embodiment, the same laser source 60 may be used to generate either the OPLM optical source or the OTDR light source. In this regard, the laser source 60 may operate either in continuous mode or in pulsed mode when driven by the pulse generator 62. The continuous mode is used to perform OPLM measurements (i.e., measure the reference power value P1 and the measurement power value P2), whereas the pulsed mode is used to perform OTDR acquisitions. When operating in pulsed mode, the light generating assembly 54 is adapted to generate test light pulses of varied pulse widths, repetition periods and optical power through a proper control of the pattern produced by the pulse generator 62. It is noted that, in other embodiments, the light source 60 may be operated in pulsed mode for both OLPM and OTDR measurements and power measurements be captured over one or more pulses.

Of course, in other embodiments, distinct light sources may be used to generate the OPLM optical source and the OTDR light source.

One skilled in the art will understand that it may be beneficial or required by the application to perform OPLM and/or OTDR measurements at various different wavelengths. For this purpose, in some embodiments, the light generating assembly 54 is adapted to generate test light having varied wavelengths by employing a laser source 60 that is tunable for example. It will be understood that the light generating assembly 54 may combine both pulse width and wavelength control capabilities. Of course, different and/or additional components may be provided in the light generating assembly, such as modulators, lenses, mirrors, optical filters, wavelength selectors and the like.

The optical source/OTDR assembly 14 therefore comprises an optical source embodied by the laser source 60, as well as an OTDR acquisition device embodied by the pulse generator 62, the detection assembly 56 and a directional coupler 58.

In order to enable OTDR acquisitions, the light generating assembly 54 is coupled to the output interface 64 of the test unit 50 through a power coupler or a directional coupler 58, such as a circulator, having three or more ports. The first port of the power or directional coupler 58 is connected to the light generating assembly 54 to receive the test light pulses therefrom. The second port is connected toward the output interface 64. The third port is connected to the detection assembly 56. The connections are such that test light pulses generated by the light generating assembly 54 are coupled to the output interface 64 and that the return light signal arising from backscattering and reflections along the DUT is coupled to the detection assembly 56.

The detection assembly 56 comprises a light detector 66, such as a photodiode, an avalanche photodiode or any other suitable photodetector, which detects the return light signal corresponding to each test light pulse, and an analog to digital converter 68 to convert the electrical signal proportional to the detected return light signal from analog to digital in order to allow data storage and processing. It will be understood that the detected return light signal may of course be amplified, filtered or otherwise processed before analog to digital conversion. The power level of return light signal as a function of time, which is obtained from the detection and conversion above, is referred to as one acquisition of an OTDR trace. One skilled in the art will readily understand that in the context of OTDR methods and systems, each light acquisition generally involves propagating a large number of substantially identical light pulses in the optical fiber link and averaging the results, in order to improve the Signal-to-Noise Ratio (SNR). In this case, the result obtained from averaging is herein referred to as an OTDR trace.

The test unit 50, and more specifically the light generating assembly 54 is controlled by the controller 70. The controller 70 is a hardware logic device. It may comprise one or more Field Programmable Gate Array (FPGA); one or more Application Specific Integrated Circuits (ASICs) or one or more processors, configured with a logic state machine or stored program instructions. When the test unit 50 is in operation, the controller 70 is configured to control the measurement process. The controller 70 may controls parameters of the light generating assembly 54 according to OTDR acquisition parameters that are either provided by the operator of the test unit software or otherwise determined by program(s).

Figure 5:
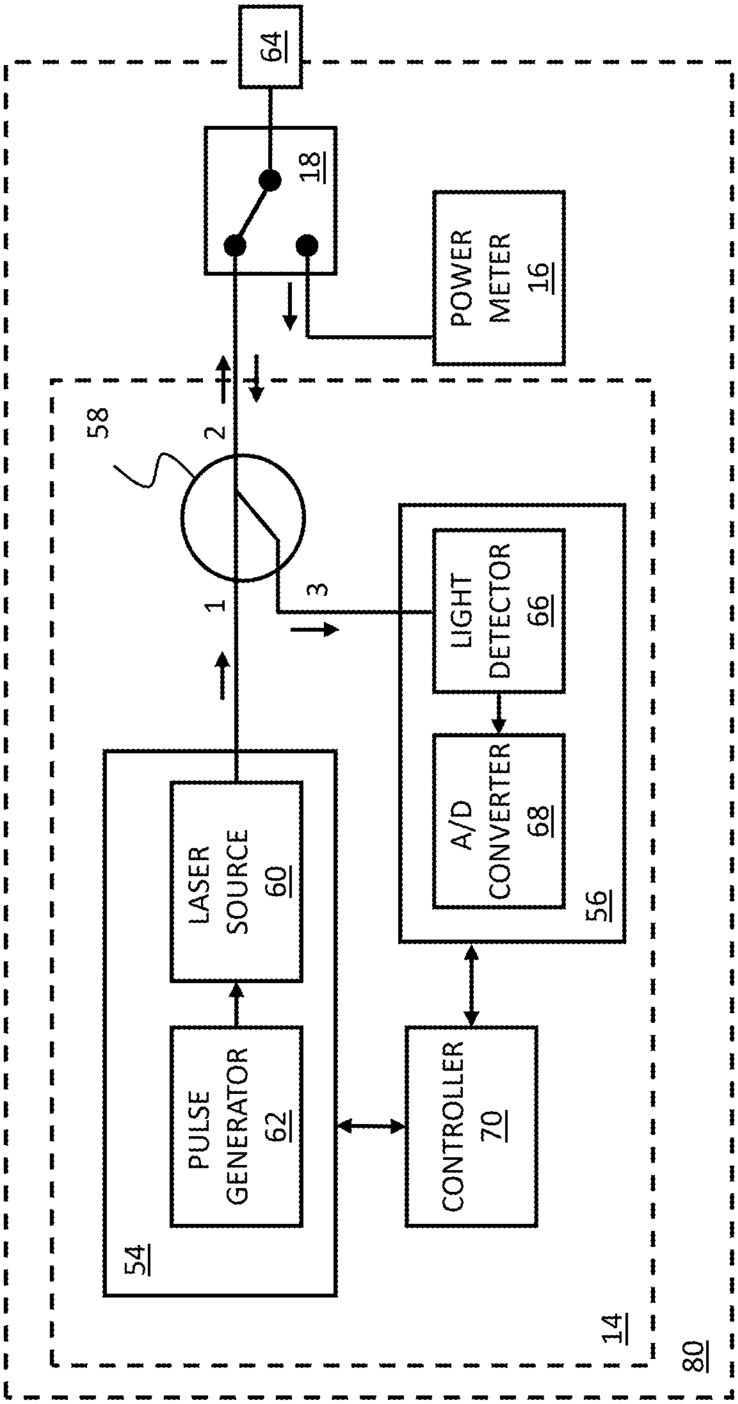
FIG. 5 is a block diagram illustrating a test unit the optical components the first test unit and/or the second test unit of the OPLM systems of FIGS. 2 and 3, in accordance with one embodiment where both test units integrate OPLM and OTDR measurement capabilities.

FIG. 5 illustrates another embodiment of a test unit 80 which may embody the first test unit 10 and/or the second test unit of the OPLM systems of FIGS. 2 and 3. In this embodiment, both test units 10, 20 may integrate OPLM and OTDR measurement capabilities. Each test unit 80 comprises an optical source 60 that is used as the light source in the OPLM measurement, and which is also used as the OTDR source in the OTDR measurement. In addition to the optical source/OTDR assembly 14 described with reference to FIG. 4, the test unit 80 also comprises a power meter 16 which is used as the power meter in the OPLM measurement and a coupling device such as an optical power splitter, a wavelength division multiplexer, an optical circulator or an optical switch 18 which is used to selectively couple the output interface 64 to either the source/OTDR or the power meter 16. It is used to select the operation of the test unit 80 is either an OTDR/optical source mode or a power meter mode. Using such the test unit 50 to embody both the first and the second test units 10, 20 enables bidirectional referencing and insertion loss measurement.

Bidirectional OTDR Characterization:

A problem with single-end OTDR measurements is the determination of insertion loss in cases where the link under test includes optical fibers having different backscattering characteristics. Small differences in fiber geometry between the different fibers induce small changes in the backscattering characteristics. This geometry mismatch between fibers may cause an apparent "gain" or a drop in the backscattered light of OTDR measurements, which introduces a bias in the insertion loss measurement. For this reason, the Telecommunications Industry Association (TIA) recommends the use of bi-directional OTDR analysis to average the results of single-ended OTDR measurements and properly characterize optical fiber links (test procedure EIA/TIA FOTP-61 "Measurement of Fiber or Cable Attenuation Using an OTDR").

In order to account for this difference in backscattering characteristics and minimize the insertion loss measurement uncertainty obtained with the reflectometric one-cord reference, the referencing procedure may determine the connection loss value Lc using a bi-directional OTDR measurement. This is made possible when using test units 10, 20 which both comprise an OTDR acquisition device. To obtain such bi-directional OTDR measurement, connection loss values Lc obtained from both ends of the reference link are simply averaged. The same also applies when using a substitution cord SC where the connection loss Lc includes the substitution cord as well as connectors C3 and C4.

For avoidance of doubt, it is noted that this bidirectional phenomenon is specific to OTDR technology. Traditional light source-power meter measurements are not impacted by the measurement direction. Therefore, in some embodiments, the optical insertion loss L of the DUT may be obtained using a unidirectional optical insertion loss measurement, whereas the reference is corrected using a bidirectional OTDR characterization of the connection loss Lc.

Figure 6A:
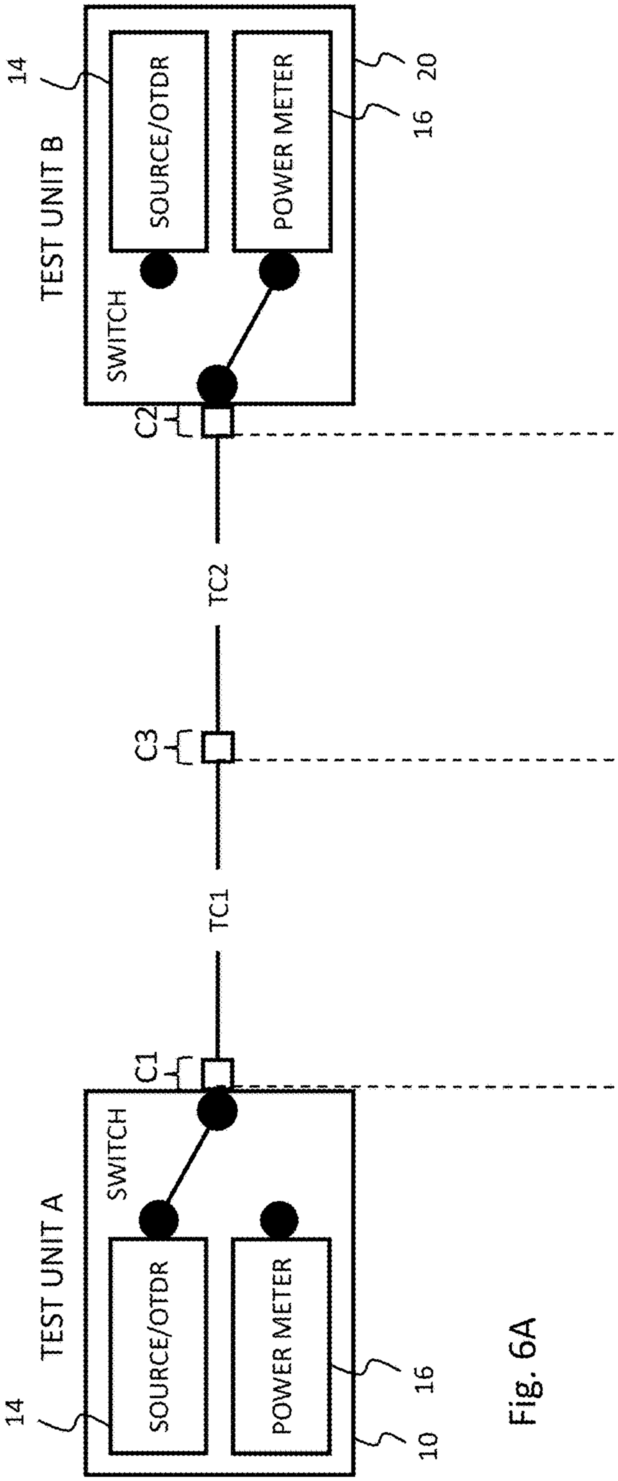
FIG. 6A is a block diagram illustrating the referencing step in direction from A to B in accordance with one embodiment where both test units integrate OPLM and OTDR measurement capabilities and where the DUT comprises complementary end connector interfaces.
Figure 6B:
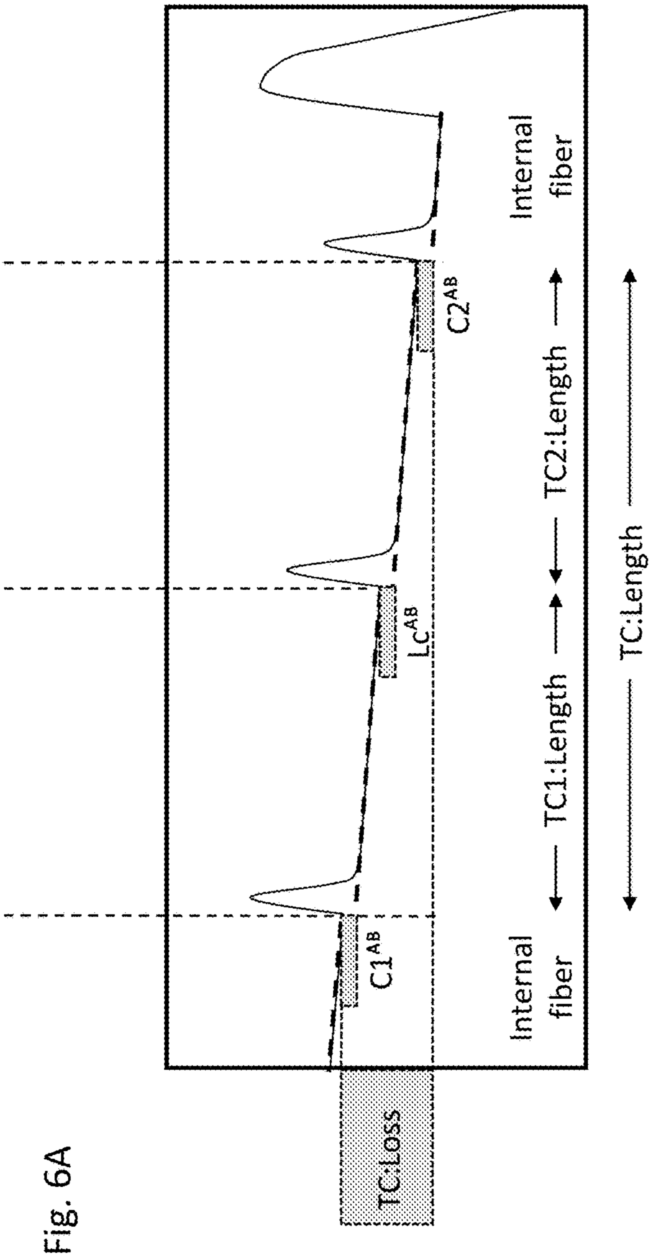
FIG. 6B is a graph illustrating an OTDR trace obtained from direction A to B in the referencing step of FIG. 6A.
Figure 7A:
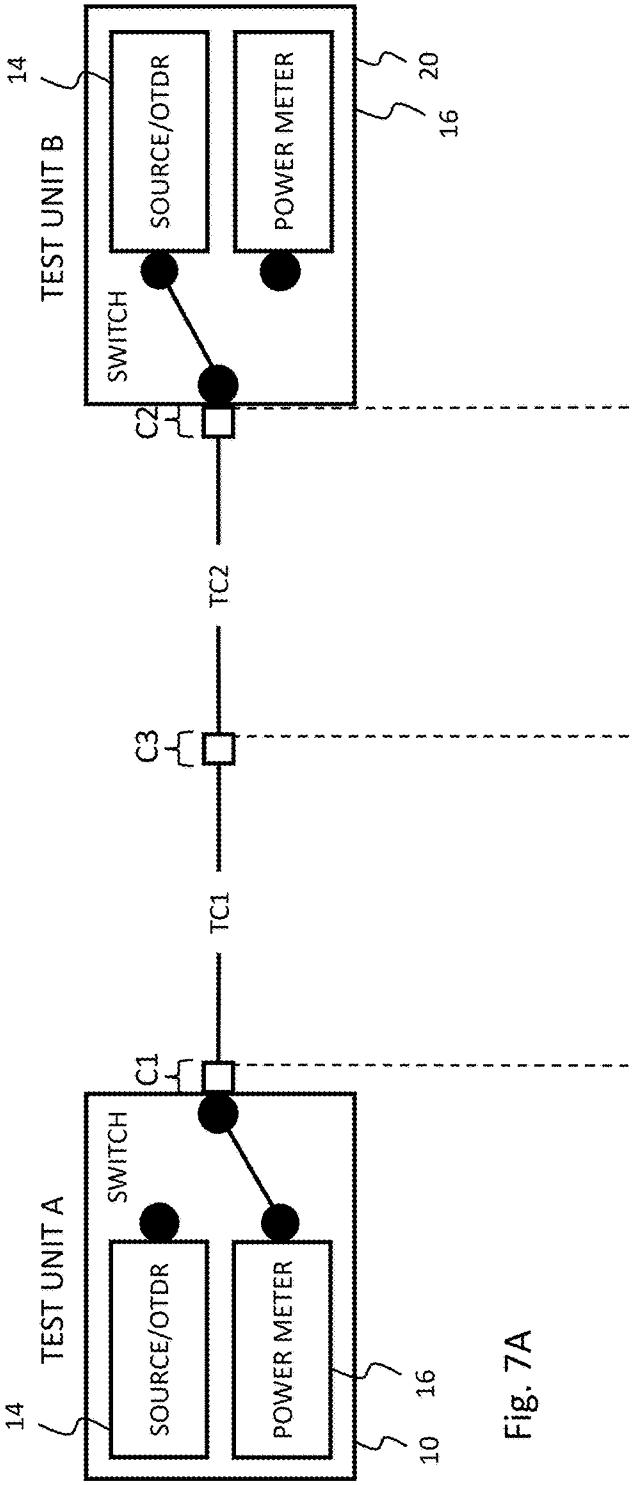
FIG. 7A is a block diagram illustrating the referencing step in direction from B to A in accordance with the embodiment of FIG. 6.
Figure 7B:
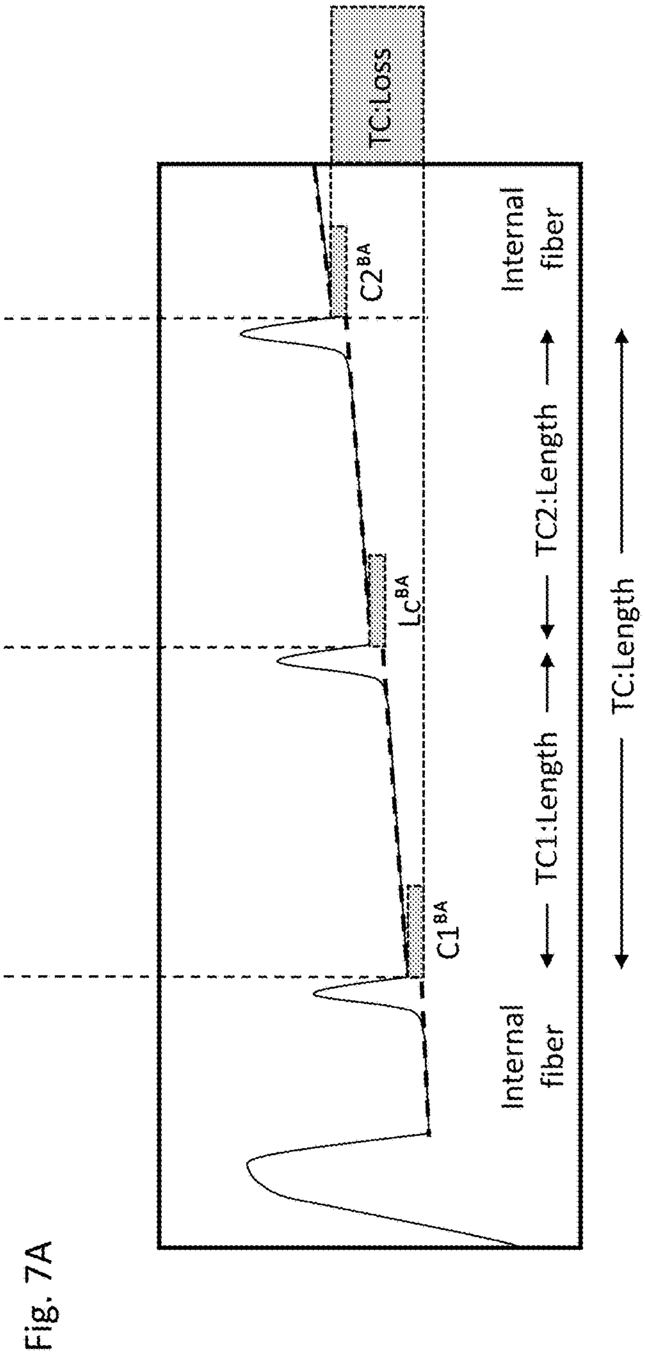
FIG. 7B is a graph illustrating an OTDR trace obtained from direction B to A in the referencing step of FIG. 7A.

Bidirectional OPLM Measurement:

FIGS. 6 and 7 illustrate the reference procedure using an optical power loss measurement (OPLM) system wherein the first test unit 10 and the second test unit 20 both include an optical source 60, an OTDR acquisition device and a power meter 16. Depending on the measurement direction, a different optical source/power meter combination is selected. In order to perform valid insertion loss measurements in both directions, each power meter should be referenced. However, both references may be based on a bidirectional OTDR measurement of the connection loss Lc.

Therefore, the method of FIG. 1 is applied using the OPLM system when configured as per FIG. 6. The method for measuring an optical insertion loss of a DUT may further comprise the following steps using the OPLM system configured as per FIG. 7:

a) measuring a second reference power value P1' of the OPLM system, the second reference power value P1' resulting from the propagation of light from the optical source of the second test unit 20 to the power meter of the first test unit 10 via the reference link;
b) measuring a measurement power value P2' resulting from the propagation of light from the optical source of the second test unit 20 to the power meter of the first test unit 10 via the test link; and
c) determining a second value of the optical insertion loss L' of the DUT based on the second reference power value P1', the second measurement power value P2' and the connection loss value Lc, wherein the connection loss value Lc may optionally be obtained from a bidirectional OTDR measurement.

Combining Bidirectional OPLM and OTDR:

FIGS. 6 and 7 illustrate the optical insertion loss measurement of a DUT using an optical power loss measurement (OPLM) system wherein the first test unit 10 and the second test unit 20 both include an optical source 60, an OTDR acquisition device and a power meter 16. As explained hereinabove, such configuration may be used to apply bidirectional OPLM as well as bidirectional OTDR. FIGS. 6 and 7 illustrate examples of the values measured to establish the OPLM referencing when the DUT has complementary end connector interfaces. The referencing step is performed on a reference link comprising a launch test cord TC1 and a receive test cord TC2.

As per FIG. 6, a first reference power value P1 of the OPLM system is measured when the first test unit 10 is set to act as the optical source 14 and the second test unit 20 is set to act as the power meter 16. An OTDR acquisition is also performed toward the reference optical waveguide link using the OTDR acquisition device of the first test unit 10 to obtain a value of the connector insertion loss $C3^{AB}$ corresponding to the at least one optical connector C3 in direction from A to B.

Then, as per FIG. 7, a second reference power value P1' of the OPLM system is measured when the second test unit 20 is set to act as the optical source 14 and the first test unit 10 is set to act as the power meter 16. An OTDR acquisition is also performed toward the reference optical waveguide link using the OTDR acquisition device of the second test unit 20 to obtain a value of the connector insertion loss $C3^{BA}$ corresponding to the at least one optical connector C3 in direction from B to A.

The connection loss value Lc corresponding to the at least one optical connector C3 is then determined by averaging connector insertion loss $C3^{AB}$ and connector insertion loss $C3^{BA}$, for example:

A to B Connection loss: $C3^{AB}$=0.28 dB

B to A Connection loss: $C3^{BA}$=0.32 dB

Connection average loss: Lc=C3=($C3^{AB}$+$C3^{BA}$)/2=0.30 dB

For example, the first corrected reference power value R may be obtained as follows:

Reference power value: P1=−10.95 dBm

Corrected reference power: R=P1+Lc=−10.95 dBm+0.30 dB=−10.65 dBm

For example, the second corrected reference power value R' may be obtained as follows:

Reference power value: P1'=−10.92 dBm

Corrected reference power: R'=P1'+Lc=−10.92 dBm+0.30 dB=−10.62 dBm

FIGS. 6 and 7 do not show the measurement step but the optical insertion loss L of the DUT from direction A to B may then be determined as described herein above. For example:

Measurement power: P2=−12.65 dBm

Optical insertion loss: L=R−P2=−10.65 dBm−−12.65 dBm=2 dB

And the optical insertion loss L' of the DUT from direction B to A may be determined. For example:

Measurement power: P2'=−12.63 dBm

Optical insertion loss: L'=R'−P2'=−10.62 dBm−−12.63 dBm=2.01 dB

Figure 8A:
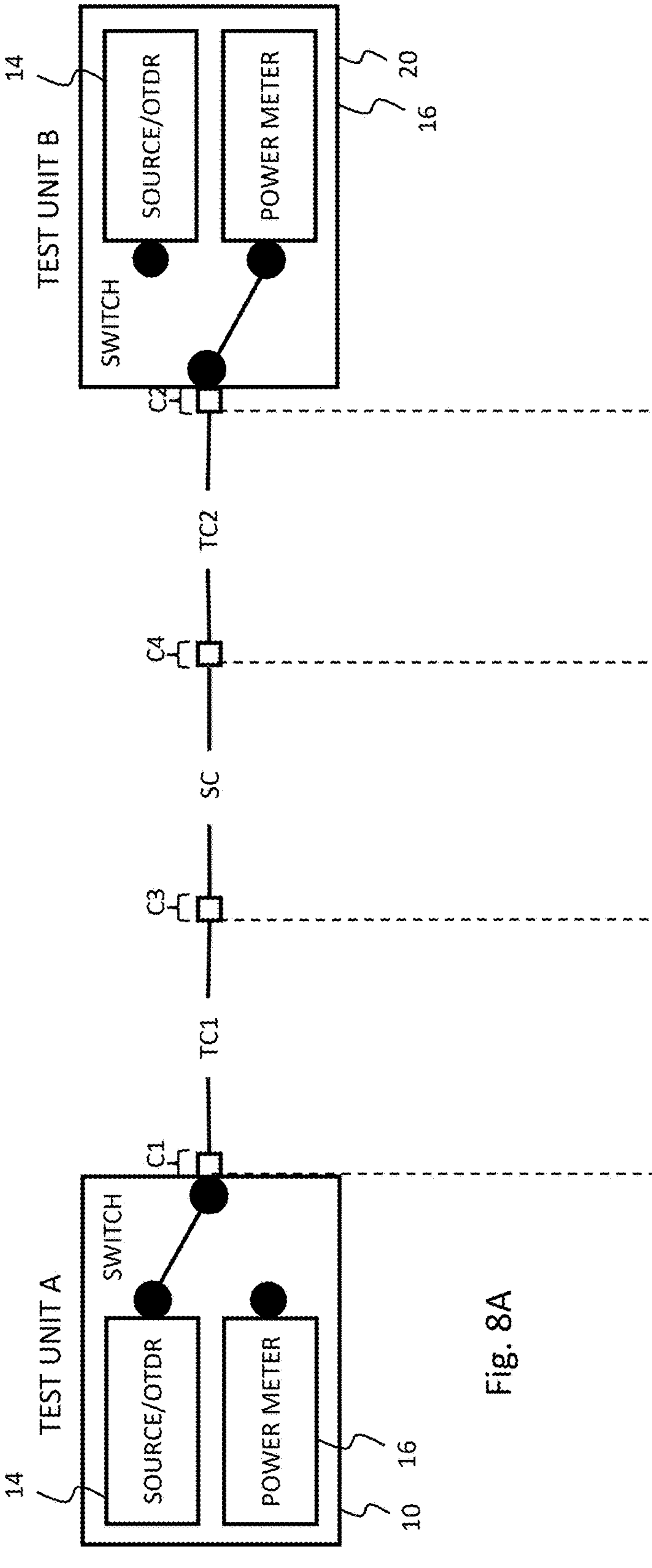
FIG. 8A is a block diagram illustrating the referencing step in direction from A to B in accordance with one embodiment where both test units integrate OPLM and OTDR measurement capabilities and where the DUT comprises incompatible end connector interfaces.
Figure 8B:
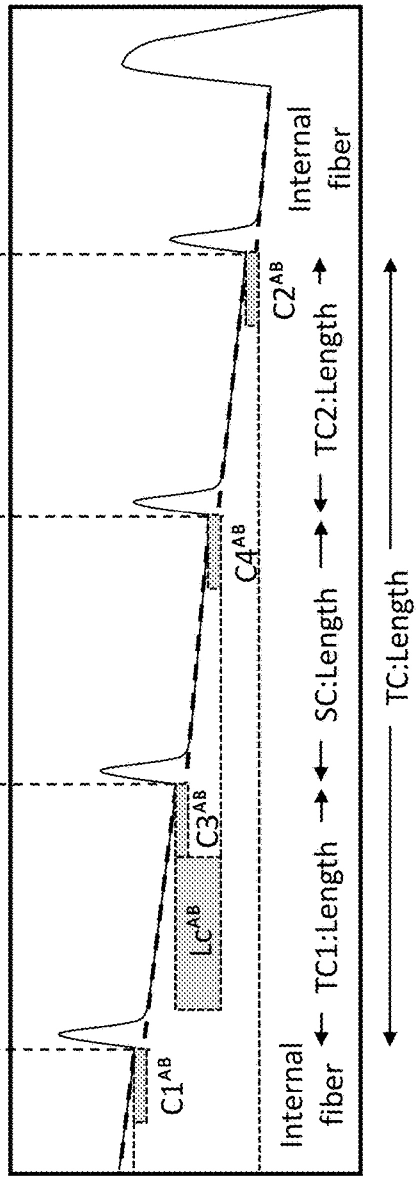
FIG. 8B is a graph illustrating an OTDR trace obtained from direction A to B in the referencing step of FIG. 8A.
Figure 9A:
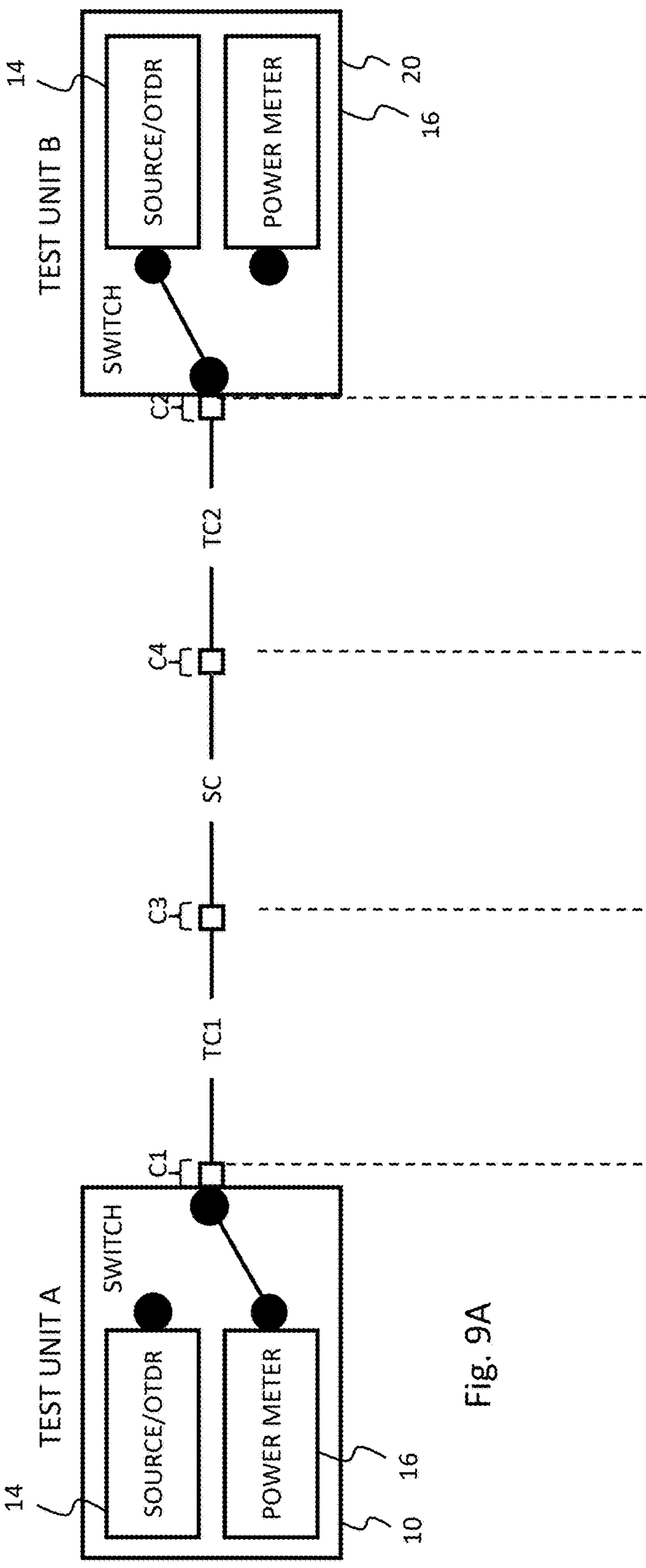
FIG. 9A is a block diagram illustrating the referencing step in direction from B to A in accordance with the embodiment of FIG. 8.
Figure 9B:
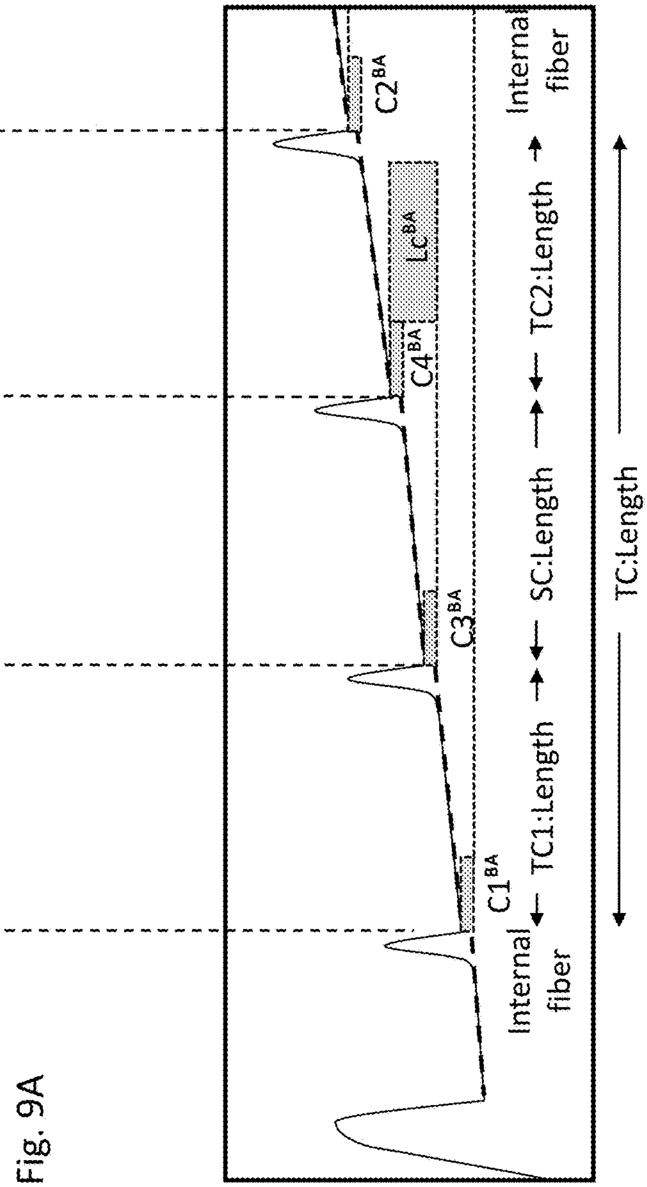

FIGS. 8 and 9 illustrate a similar example but for cases where the DUT has incompatible end connector interfaces. The referencing step is performed on a reference link comprising a launch test cord TC1, as substitution cord SC and a receive test cord TC2.

Again, as per FIG. 8, a first reference power value P1 of the OPLM system is measured when the first test unit 10 is set to act as the optical source 14 and the second test unit 20 is set to act as the power meter 16. An OTDR acquisition is also performed toward the reference optical waveguide link using the OTDR acquisition device of the first test unit 10 to obtain a value of the connection loss $Lc^{AB}$ corresponding to optical connector C3, the substitution waveguide SC and optical connector C4 in direction from A to B.

Then, as per FIG. 9, a second reference power value P1' of the OPLM system is measured when the second test unit 20 is set to act as the optical source 14 and the first test unit 10 is set to act as the power meter 16. An OTDR acquisition is also performed toward the reference optical waveguide link using the OTDR acquisition device of the second test unit 20 to obtain a value of the connection loss $Lc^{BA}$ corresponding to optical connector C3, the substitution waveguide SC and optical connector C4 in direction from B to A.

The connection loss value Lc is then determined by averaging connector insertion loss $Lc^{AB}$ and connector insertion loss $Lc^{BA}$, for example:

A to B Substitution cord loss: $Lc^{AB}$=0.55 dB

B to A Substitution cord loss: $Lc^{BA}$=0.45 dB

Substitution cord average loss: Lc=($Lc^{AB}$+$Lc^{BA}$)/2=0.50 dB

For example, the first corrected reference power value R may be obtained as follows:

Reference power value: P1=−10.75 dBm

Corrected reference power: R=P1+Lc=−10.75 dBm+0.50 dB=−10.25 dBm

For example, the second corrected reference power value R' may be obtained as follows:

Reference power value: P1'=−10.72 dBm

Corrected reference power: R'=P1'+Lc=−10.72 dBm+0.50 dB=−10.22 dBm

FIGS. 8 and 9 do not show the measurement step but it will be understood that the optical insertion loss L of the DUT from direction A to B may then be determined as described herein above. For example:

Measurement power: P2=−12.65 dBm

Optical insertion loss: L=R−P2=−10.25 dBm−−12.25 dBm=2 dB

And the optical insertion loss L of the DUT from direction B to A may be determined. For example:

Measurement power: P2'=−12.23 dBm

Optical insertion loss: L'=R'−P2'=−10.22 dBm−−12.23 dBm=2.01 dB

Smart Referencing:

It is noted that, the various values recorded with the reflectometric one-cord method can be saved with the measurement data in order to provide intelligent diagnostics as well as advanced post-measurement capabilities.

For example, this data may be used to check the integrity of a reference with respect to a new measurement by comparing the connector losses and/or test cord lengths to ensure they are compatible. The test units may then notify the user if the current test cord characteristics no longer match those originally referenced. Diagnostics may further inform the user and suggest solutions to solve the problem.

Furthermore, in post-processing, it is possible to include or not the loss of the first and/or last connector as needed without having to take new measurements. This capacity becomes independent of the reference method.

Distant Test Units:

In OPLM systems, the conventional one-cord reference method becomes impossible to apply when the test units are too distant from one another. The herein-provided reflectometric one-cord reference allows to make a reference using a substitution cord SC between test cord TC1 and test cord TC2, which can be as long as necessary and as long as the DUT. The reflectometric one-cord reference can perform a distant OPLM reference as if the units were side-by-side. The OTDR measurement is used to correct the reference to remove the effect of any longer fiber section including any potential connectors and/or splices present along the substitution cord SC and therefore obtain an equivalent of the one-cord reference.

Furthermore, the OTDR measurement may be used to evaluate if the substitution cord SC used for the reference meets certain criteria for the reference to be valid. For example, the reference procedure can be aborted if the substitution cord SC is too long, or its insertion loss is greater than an acceptable limit.

Another advantage of the reflectometric one-cord reference is that it does not necessitate a large surface detector to perform the reference.

Example of Test Unit Architecture

Figure 10:
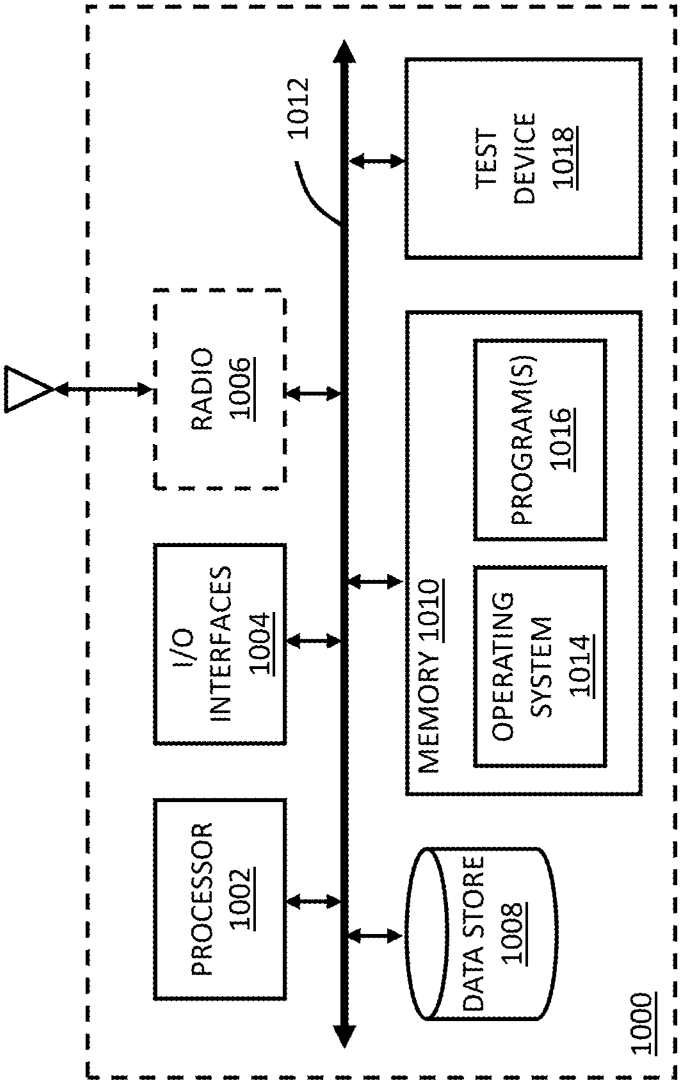
FIG. 10 is a block diagram illustrating an example architecture of a test unit of the systems of FIG. 1, 2, 3, 4, 5, 6, 7, 8 or 9, in accordance with one embodiment.

FIG. 10 is a block diagram of a test instrument 1000 which may embody the test unit 10 or 20 of the system of FIGS. 2, 3, 4, 5, 6, 7, 8 and 9. The test instrument 1000 may comprise a digital device that, in terms of hardware architecture, generally includes a processor 1002, input/output (I/O) interfaces 1004, an optional radio 1006, a data store 1008, a memory 1010, as well as an optical test device 1018 such as optical components of the test unit 50 of FIG. 4 or test unit 80 of FIG. 5. It should be appreciated by those of ordinary skill in the art that FIG. 10 depicts the test instrument 1000 in a simplified manner, and a practical embodiment may include additional components and suitably configured processing logic to support known or conventional operating features that are not described in detail herein. A local interface 1012 interconnects the major components. The local interface 1012 can be, for example, but not limited to, one or more buses or other wired or wireless connections, as is known in the art. The local interface 1012 can have additional elements, which are omitted for simplicity, such as controllers, buffers (caches), drivers, repeaters, and receivers, among many others, to enable communications. Further, the local interface 1012 may include address, control, and/or data connections to enable appropriate communications among the aforementioned components.

The processor 1002 is a hardware device for executing software instructions. The processor 1002 may comprise one or more processors, including central processing units (CPU), auxiliary processor(s) or generally any device for executing software instructions. When the test instrument 1000 is in operation, the processor 1002 is configured to execute software stored within the memory 1010, to communicate data to and from the memory 1010, and to generally control operations of the test instrument 1000 pursuant to the software instructions. In an embodiment, the processor 1002 may include an optimized mobile processor such as optimized for power consumption and mobile applications. The I/O interfaces 1004 can be used to receive user input from and/or for providing system output. User input can be provided via, for example, a keypad, a touch screen, a scroll ball, a scroll bar, buttons, barcode scanner, and the like. System output can be provided via a display device such as a liquid crystal display (LCD), touch screen, and the like, via one or more LEDs or a set of LEDs, or via one or more buzzer or beepers, etc. The I/O interfaces 1004 can be used to display a graphical user interface (GUI) that enables a user to interact with the test instrument 1000 and/or output at least one of the values derived by the OPLM analyzing module.

The radio 1006, if included, may enable wireless communication to an external access device or network. Any number of suitable wireless data communication protocols, techniques, or methodologies can be supported by the radio 1006, including, without limitation: RF; IrDA (infrared); Bluetooth; ZigBee (and other variants of the IEEE 802.15 protocol); IEEE 802.11 (any variation); IEEE 802.16 (WiMAX or any other variation); Direct Sequence Spread Spectrum; Frequency Hopping Spread Spectrum; Long Term Evolution (LTE); cellular/wireless/cordless telecommunication protocols (e.g. 3G/4G, etc.); NarrowBand Internet of Things (NB-IoT); Long Term Evolution Machine Type Communication (LTE-M); magnetic induction; satellite data communication protocols; and any other protocols for wireless communication. The data store 1008 may be used to store data, such as OTDR traces and OPLM and OTDR measurement data files. The data store 1008 may include any of volatile memory elements (e.g., random access memory (RAM, such as DRAM, SRAM, SDRAM, and the like)), nonvolatile memory elements (e.g., ROM, hard drive, tape, CDROM, and the like), and combinations thereof. Moreover, the data store 1008 may incorporate electronic, magnetic, optical, and/or other types of storage media.

The memory 1010 may include any of volatile memory elements (e.g., random access memory (RAM, such as DRAM, SRAM, SDRAM, etc.)), nonvolatile memory elements (e.g., ROM, hard drive, etc.), and combinations thereof. Moreover, the memory 1010 may incorporate electronic, magnetic, optical, and/or other types of storage media. Note that the memory 1010 may have a distributed architecture, where various components are situated remotely from one another, but can be accessed by the processor 1002. The software in memory 1010 can include one or more computer programs, each of which includes an ordered listing of executable instructions for implementing logical functions. In the example of FIG. 10, the software in the memory 1010 includes a suitable operating system (O/S) 1014 and computer programs 1016. The operating system 1014 essentially controls the execution of other computer programs and provides scheduling, input-output control, file and data management, memory management, and communication control and related services. The program(s) 1016 may include various applications, add-ons, etc. configured to provide end-user functionality with the test instrument 1000. For example, example programs 1016 may include a web browser to connect with a server for transferring measurement data files, a dedicated test application configured to control OPLM references and measurements and OTDR acquisitions by the test device 1018, set OTDR acquisition parameters, analyze OTDR traces obtained by the OTDR acquisition device and display a GUI related to the test instrument 1000. For example, the dedicated application may embody an OPLM analysis module configured to analyze the measured values in order to characterize the optical fiber link under test, and produce measurement data files.

It is noted that, in some embodiments, the I/O interfaces 1004 may be provided via a physically distinct mobile device (not shown), such as a handheld computer, a smartphone, a tablet computer, a laptop computer, a wearable computer or the like, e.g., communicatively coupled to the test instrument 1000 via the radio 1006. In such cases, at least some of the programs 1016 may be located in a memory of such a mobile device, for execution by a processor of the physically distinct device. The mobile device may then also include a radio and be used to transfer measurement data files toward a remote test application residing, e.g., on a server.

It will be appreciated that some embodiments described herein may include one or more generic or specialized processors ("one or more processors") such as microprocessors; Central Processing Units (CPUs); Digital Signal Processors (DSPs): customized processors such as Network Processors (NPs) or Network Processing Units (NPUs), Graphics Processing Units (GPUs), or the like; Field Programmable Gate Arrays (FPGAs); and the like along with unique stored program instructions (including both software and firmware) for control thereof to implement, in conjunction with certain non-processor circuits, some, most, or all of the functions of the methods and/or systems described herein. Alternatively, some or all functions may be implemented by a state machine that has no stored program instructions, or in one or more Application Specific Integrated Circuits (ASICs), in which each function or some combinations of certain of the functions are implemented as custom logic or circuitry. Of course, a combination of the aforementioned approaches may be used. For some of the embodiments described herein, a corresponding device in hardware and optionally with software, firmware, and a combination thereof can be referred to as "circuitry configured or adapted to," "logic configured or adapted to," etc. perform a set of operations, steps, methods, processes, algorithms, functions, techniques, etc. on digital and/or analog signals as described herein for the various embodiments.

Moreover, some embodiments may include a non-transitory computer-readable storage medium having computer readable code stored thereon for programming a computer, server, appliance, device, processor, circuit, etc. each of which may include a processor to perform functions as described and claimed herein. Examples of such computer-readable storage mediums include, but are not limited to, a hard disk, an optical storage device, a magnetic storage device, a ROM (Read Only Memory), a PROM (Programmable Read Only Memory), an EPROM (Erasable Programmable Read Only Memory), an EEPROM (Electrically Erasable Programmable Read Only Memory), Flash memory, and the like. When stored in the non-transitory computer-readable medium, software can include instructions executable by a processor or device (e.g., any type of programmable circuitry or logic) that, in response to such execution, cause a processor or the device to perform a set of operations, steps, methods, processes, algorithms, functions, techniques, etc. as described herein for the various embodiments.

It should be noted that the test instrument shown in FIG. 10 is meant as an illustrative example only. Numerous types of computer systems are available and can be used to implement the test instrument.

The embodiments described above are intended to be exemplary only and one skilled in the art will recognize that numerous modifications can be made to these embodiments without departing from the scope of the invention. The scope of the invention is therefore intended to be limited solely by the appended claims.

Although the present disclosure has been illustrated and described herein with reference to specific embodiments and examples thereof, it will be readily apparent to those of ordinary skill in the art that other embodiments and examples may perform similar functions and/or achieve like results. All such equivalent embodiments and examples are within the spirit and scope of the present disclosure, are contemplated thereby, and are intended to be covered by the following claims.

The invention claimed is:

1. A method for measuring an optical insertion loss of an optical device under test (DUT) using an optical power loss measurement (OPLM) system comprising a first test unit comprising a first optical source, a second test unit comprising a first power meter and a first optical time domain reflectometer (OTDR) acquisition device in one of the first and the second test unit, the method comprising the steps of:

measuring a reference power value P1 of the OPLM system, the reference power value P1 resulting from the propagation of light from the first optical source to the first power meter via a reference optical waveguide link connected between the first test unit and the second test unit and comprising a launch test waveguide TC1, a receive test waveguide TC2 and at least one optical connector C3 therebetween;

performing an OTDR acquisition toward the reference optical waveguide link using the first OTDR acquisition device to obtain a first OTDR trace;

using at least the first OTDR trace, determining a connection loss value Lc corresponding to the at least one optical connector C3;

measuring a measurement power value P2 resulting from the propagation of light from the first optical source to the first power meter via a test link connected between the first test unit and the second test unit and comprising the DUT connected in series between the launch test waveguide TC1 and the receive test waveguide TC2; and determining a first value of the optical insertion loss L of the DUT based on the reference power value P1, the measurement power value P2 and the connection loss value Lc as determined from at least the first OTDR trace.

2. The method as claimed in claim 1, further comprising determining a corrected reference power value R based on the reference power value P1 and the connection loss value Lc; and wherein the first value of the optical insertion loss L of the DUT is determined based on the measurement power value P2 and the corrected reference power value R.

3. The method as claimed in claim 1, wherein said determining a first value of the optical insertion loss L of the DUT comprises adjusting a responsivity of the first power meter in accordance with the connection loss value Lc before measuring the measurement power value P2 and determining a value of the optical insertion loss L of the DUT based on the reference power value P1 and the measurement power value P2.

4. The method as claimed in claim 1, wherein the reference optical waveguide link further comprises a substitution waveguide SC connected in series between the launch test waveguide TC1 and the receive test waveguide TC2;

wherein the at least a one optical connector comprises the substitution waveguide SC, a first optical connector C3 between the launch test waveguide TC1 and the substitution waveguide SC and a second optical connector C4 between the substitution waveguide SC and the receive test waveguide TC2; and wherein the step of determining the connection loss value Lc determines the connection loss Lc as corresponding to at least the first optical connector C3, the substitution waveguide SC and the second optical connector C4.

5. The method as claimed in claim 1, wherein the first OTDR acquisition device is comprised in the first test unit;

wherein said measuring a reference power value P1 and said measuring a measurement power value P2 comprise operating the first optical source in continuous mode; and wherein said performing an OTDR acquisition comprises operating the first optical source in pulsed mode to perform the first OTDR acquisition.

6. The method as claimed in claim 1, wherein the first OTDR acquisition device is comprised in the first test unit and wherein the second test unit further comprises a second OTDR acquisition device and a second optical source and wherein the method further comprises:

performing an OTDR acquisition toward the reference optical waveguide link using the second OTDR acquisition device to obtain a second OTDR trace;

wherein said determining a connection loss value Lc corresponding to the at least one optical connector C3 is made using at least the first OTDR trace and the second OTDR trace.

7. The method as claimed in claim 6, wherein the first test unit further comprises a second power meter.

8. The method as claimed in claim 7, further comprising:

measuring a second reference power value P1' of the OPLM system, the second reference power value resulting from the propagation of light from the second optical source to the second power meter via the reference optical waveguide link;

measuring a second measurement power value P2' resulting from the propagation of light from the second optical source to the second power meter via the test link; and determining a second value of the optical insertion loss L' of the DUT based on the second reference power value P1', the second measurement power value P2' and the connection loss value Lc.

9. An optical power loss measurement (OPLM) system to be used for measuring an optical insertion loss of an optical device under test (DUT), the system comprising:

a first test unit comprising:

a first connector interface; and a first optical source optically coupled to the first connector interface;

a second test unit comprising:

a second connector interface; and a first power meter optically coupled to the second connector interface;

a first optical time domain reflectometer (OTDR) acquisition device integrated in one of the first test unit and the second test unit; and a processing unit in communication with the first test unit and the second test unit, and a memory storing computer instructions that, when executed by the processing unit, cause the processing unit to perform the steps of:

receiving a reference power value P1 of the OPLM system measured using the first power meter and resulting from the propagation of light from the first optical source to the first power meter via a reference optical waveguide link connected between the first test unit and the second test unit and comprising a launch test waveguide TC1, a receive test waveguide TC2 and at least one optical connector C3 therebetween;

receiving a first OTDR trace obtained from a first OTDR acquisition performed toward the reference optical waveguide link using the first OTDR acquisition device;

using at least the first OTDR trace, determining a connection loss value Lc corresponding to the at least one optical connector C3;

receiving a measurement power value P2 measured using the first power meter and resulting from the propagation of light from the first optical source to the first power meter via a test link connected between the first test unit and the second test unit and comprising the DUT connected in series between the launch test waveguide TC1 and the receive test waveguide TC2; and determining a first value of the optical insertion loss L of the DUT based on the reference power value P1, the measurement power value P2 and the connection loss value Lc as determined from at least the first OTDR trace.

10. The system as claimed in claim 9, wherein the computer instructions further cause the processing unit to perform the step of:

determining a corrected reference power value R based on the reference power value P1 and the connection loss value Lc;

wherein the first value of the optical insertion loss L of the DUT is determined based on the measurement power value P2 and the corrected reference power value R.

11. The system as claimed in claim 9, wherein said determining a first value of the optical insertion loss L of the DUT comprises adjusting a responsivity of the first power meter in accordance with the connection loss value Lc before the measurement power value P2 is measured and determining a value of the optical insertion loss L of the DUT based on the reference power value P1 and the measurement power value P2.

12. The system as claimed in claim 9, wherein the first OTDR acquisition device is comprised in the first test unit and comprises a first pulse generator coupled to drive the first optical source to generate an OTDR test signal comprising one or more test light pulses and wherein the first optical source operates in continuous mode to measure the reference power value P1 and the measurement power value P2 and operates in pulsed mode to perform the first OTDR acquisition.

13. The system as claimed in claim 9, wherein the reference optical waveguide link further comprises a substitution waveguide SC connected in series between the launch test waveguide TC1 and the receive test waveguide TC2;

wherein the at least one optical connector comprises a first optical connector C3 between the launch test waveguide TC1 and the substitution waveguide SC and a second optical connector C4 between the substitution waveguide SC and the second test waveguide TC2; and wherein the step of determining the connection loss value Lc determines the connection loss Lc as corresponding to at least the first optical connector C3, the substitution waveguide SC and the second optical connector C4.

14. The system as claimed in claim 9, wherein the first OTDR acquisition device is comprised in the first test unit and wherein the second test unit further comprises a second OTDR acquisition device and a second optical source and wherein the second OTDR acquisition device, the second optical source and the first power meter are optically coupled to the second connector interface;

wherein the computer instructions further cause the processing unit to perform the step of: receiving a second OTDR trace obtained from a second OTDR acquisition performed toward the reference optical waveguide link using the second OTDR acquisition device; and wherein said determining a connection loss value Lc corresponding to the at least one optical connector C3 is made using at least the first OTDR trace and the second OTDR trace.

15. The system as claimed in claim 14, wherein the second OTDR acquisition device comprises a second pulse generator coupled to drive the second optical source to generate an OTDR test signal comprising one or more test light pulses.

16. The system as claimed in claim 14, wherein the first test unit further comprises a second power meter optically coupled to the first connector interface.

17. The system as claimed in claim 16, wherein the first test unit further comprises a first optical switch to selectively couple toward the first connector interface either the second power meter or the first optical source and the first OTDR acquisition device; and wherein the second test unit further comprises a second optical switch to selectively couple toward the second connector interface either the first power meter or the second optical source and the second OTDR acquisition device.

18. The system as claimed in claim 16, wherein the computer instructions further cause the processing unit to perform the steps of:

receiving a second reference power value P1' of the OPLM system measured using the second power meter and resulting from the propagation of light from the second optical source to the second power meter via the reference optical waveguide link;

receiving a second measurement power value P2' measured using the second power meter and resulting from the propagation of light from the second optical source to the second power meter via the test link; and determining a second value of the optical insertion loss L' of the DUT based on the second reference power value P1', the second measurement power value P2' and the connection loss value Lc.

19. The system as claimed in claim 18, wherein the second optical source operates in continuous mode to measure the reference power value P1' and the measurement power value P2' and operates in pulsed mode to perform the second OTDR acquisition.

20. A method for referencing an optical power loss measurement (OPLM) system to be used for measuring an optical insertion loss of an optical device under test (DUT) and comprising a first test unit comprising a first optical source, a second test unit comprising a first power meter and a first optical time domain reflectometer (OTDR) acquisition device in one of the first and the second test unit, the method comprising the steps of:

measuring a reference power value P1 of the OPLM system, the reference power value resulting from the propagation of light from the first optical source to the first power meter via a reference optical waveguide link connected between the first test unit and the second test unit and comprising a launch test waveguide TC1, a receive test waveguide TC2 and at least one optical connector C3 therebetween;

performing an OTDR acquisition toward the reference optical waveguide link using the first OTDR acquisition device to obtain a first OTDR trace;

using at least the first OTDR trace, determining a connection loss value Lc corresponding to the at least one optical connector C3; and determining a corrected reference power value R based on the reference power value P1 and the connection loss value Lc.

* * * * *